US006881457B2

(12) United States Patent
Tasaka et al.

(10) Patent No.: US 6,881,457 B2

(45) Date of Patent: Apr. 19, 2005

(54) OPTICAL COMPENSATION FILM, VIEWING ANGLE COMPENSATION INTEGRAL TYPE POLARIZING PLATE AND LIQUID CRYSTAL DISPLAY APPARATUS

(75) Inventors: Koji Tasaka, Hachioji (JP); Takatoshi Yajima, Hachioji (JP); Noriyasu Kuzuhara, Kunitachi (JP); Hiroki Umeda, Hino (JP)

(73) Assignee: Konica Minolta Holdings, Inc. (JP)

( * ) Notice: Subject to any disclaimer, the term of this patent is extended or adjusted under 35 U.S.C. 154(b) by 0 days.

(21) Appl. No.: 10/776,790

(22) Filed: Feb. 11, 2004

(65) Prior Publication Data

US 2004/0161551 A1 Aug. 19, 2004

(30) Foreign Application Priority Data

Feb. 19, 2003 (JP) ....................................... 2003-041030

(51) Int. Cl.[7] ............................................. G02F 1/1335

(52) U.S. Cl. ....................... 428/1.3; 428/1.33; 349/117; 349/96

(58) Field of Search ......................... 428/1.1, 1.3, 1.33; 349/117, 96, 119, 122, 138

(56) References Cited

U.S. PATENT DOCUMENTS 6,417,904 B1 * 7/2002 Yamaoka et al. ........... 349/117
6,476,892 B1 * 11/2002 Aminaka .................... 349/117
6,559,912 B1 * 5/2003 Aminaka ..................... 349/96

FOREIGN PATENT DOCUMENTS

JP 2000-154201 6/2000
JP 2002-156527 5/2002

* cited by examiner

*Primary Examiner*—Harold Pyon
*Assistant Examiner*—Sow-Fun Hon
(74) *Attorney, Agent, or Firm*—Muserlian, Lucas and Mercanti

(57) ABSTRACT

An optical compensation film comprising a cellulose ester film is disclosed. In the film, (a) each of photoelastic coefficient C(md) in a mechanical direction and photoelastic coefficient C(td) in the transverse direction of the cellulose ester film is $1\times10^{-9}$ to $1\times10^{-13}$ $Pa^{-1}$ and C(md)<C(td), (b) retardation $R_0$ within the plane of the cellulose film defined by Formula (I) is 20 to 70 nm, (c) retardation $R_t$ of the cellulose ester film in a thickness direction, defined by Formula (II) is 70 to 400 nm, and (d) both of a dimensional variation ratio S(md) in the mechanical direction and a dimensional variation ratio S(td) in the transverse direction of the cellulose ester film prior to and after being allowed to stand at ambient conditions of 80° C. and 90 percent relative humidity for 50 hours are −1 to 1 percent, and |S(md)|>|S(td)|.

9 Claims, No Drawings

OPTICAL COMPENSATION FILM, VIEWING ANGLE COMPENSATION INTEGRAL TYPE POLARIZING PLATE AND LIQUID CRYSTAL DISPLAY APPARATUS

BACKGROUND OF THE-INVENTION

The present invention relates to an optical compensation film, an optical compensation film support, a viewing angle compensation integral type polarizing plate, and a liquid crystal display apparatus.

Currently, cellulose acetate film (represented by cellulose triacetate film) is widely employed to prepare silver halide light-sensitive photographic materials as well as optical films due to its desirable characteristics such as high transparency as well as minimal optical drawbacks. Particularly, cellulose acetate film is preferably employed as a polarizing plate protective film for liquid crystal display apparatuses.

Incidentally, when images on a crystal liquid display apparatus are viewed from an oblique direction, image quality is degraded compared to that when viewed directly from the front. The resulting image degradation is due to viewing angle characteristics inherent in liquid crystal display apparatuses. In order overcome this drawback, an effective method is known in which viewing angle compensation film is arranged between the liquid crystal cell and the polarizer (refer, for example, to Japanese Patent Publication Open to Public Inspection Nos. 2000-154201 and 2002-156527).

However, it has been found that problems are not completely solved employing the aforesaid method.

(Patent Document 1)

Japanese Patent Publication Open to Public Inspection No. 2000-154201

(Patent Document 2)

Japanese Patent Publication Open to Public Inspection No. 2002-156527

The inventors of the present invention conducted investigations in an attempt to solve the aforesaid problems. As a result, Japanese Patent Application No. 2002-322923 was submitted. The patent application discloses markedly effective techniques described below. In the viewing angle compensation integral type polarizing plate, stated in the specification of the aforesaid patent, an appropriate phase difference compensation function is given to a polarizing plate protective film. Consequently, the production process is abbreviated to allow the viewing angle compensation film to adhere to the polarizing plate. As a result, it is possible to simplify the production process and to decrease the thickness of liquid crystal display apparatuses. However, in the aforesaid invention, since film is oriented in the transverse (td) direction (or lateral direction), residual strain remains. The aforesaid residual strain results in dimensional variation during storage. As a result, in practice, critical problems have occurred in which the polarizing plate, adhered onto the liquid crystal cell, peels off.

In order to overcome the aforesaid problems, a method is considered in which physical dimensional variation is minimized, for example, by increasing the adhesion force of an adhesive which adheres a liquid crystal cell to a polarizing plate. This technique minimizes physical dimensional variation, but the film is apparently in a state of orientation or contraction, resulting in a state in which stress is applied to the film. The resulting stress varies the retardation of the film and markedly affects viewing angle compensation characteristics during storage. As a result, in view of durability of the viewing angle characteristics, critical problems have practically occurred.

SUMMARY OF THE INVENTION

An objective of the present invention is to provide an optical compensation film which exhibits excellent viewing angle compensation function and also to provide an optical compensation film support capable of enhancing durability of the viewing angle compensation function during storage, an optical compensation film, a viewing angle compensation integral type polarizing plate, and a liquid crystal display apparatus.

The objective of the present invention was achieved as described below.

(1) An optical compensation film comprising a cellulose ester film comprising cellulose ester wherein (a) each of photoelastic coefficient C(md) in a mechanical direction and photoelastic coefficient C(td) in a transverse direction of the cellulose ester film is $1\times10^{-9}$ to $1\times10^{-13}$ $Pa^{-1}$, and C(md)<C(td), (b) retardation $R_0$ within a plane of the cellulose film defined by Formula (I) is 20 to 70 nm, (c) retardation $R_t$ of the cellulose ester film in a thickness direction defined by Formula (II) is 70 to 400 nm, and (d) each of a dimensional variation ratio S(md) in the mechanical direction and a dimensional variation ratio S(td) in the transverse direction of the cellulose ester film prior to and after being allowed to stand at ambient conditions of 80° C. and 90 percent relative humidity for 50 hours are −1 to 1 percent, and |S(md)|>|S(td)|.

$$R_0=(nx-ny)\times d \quad (I)$$

$$R_t=\{(nx+ny)/2-nz\}\times d \quad (II)$$

wherein nx is a refractive index in a transverse direction within a film plane, ny is a refractive index in a mechanical direction, nz is a refractive index in a thickness direction of the film, and d is a thickness of the film in nm.

(2) The optical compensation film, described in (1), which comprises at least one optically anisotropic layer.

(3) The optical compensation film, described in (1) or (2), wherein cellulose ester of the cellulose ester film simultaneously satisfies Formulas (IV) and (V) given below.

$$2.55\leq X+Y\leq 2.85 \quad (IV)$$

$$1.4\leq X\leq 2.85 \quad (V)$$

wherein X is the degree of substitution of an acetyl group and Y is a degree of substitution of a propionyl group and/or a butyryl group.

(4) The optical compensation film, described in any one of (1) to (3), wherein the cellulose ester of the cellulose ester film has a degree of acetylation of 59.0–61.5 percent, and comprises a compound having at least two aromatic rings in an amount of 0.1 to 20 parts by weight with respect to 100 parts by weight of cellulose ester.

(5) The optical compensation film, described in any one of (2) to (4), wherein the optically anisotropic layer has a fixed nematic hybrid orientation structure.

(6) The optical compensation film, described in any one of (2) to (5), wherein the optically anisotropic layer contains a liquid crystal compound.

(7) In a viewing angle compensation integral type polarizing plate comprised of two protective films and a polarizer, a viewing angle compensation integral type polarizing plate wherein at least one of said protective films is an optical compensation film, described in any one of (1) to (6), and the delayed phase axis of the ester film in said optical compensation film and the transparent axis of said polarizer are substantially parallel.

(8) A liquid crystal display apparatus employing the viewing angle compensation integral type polarizing plate described in (7).

(9) A support for an optical compensation film wherein (a) each of photoelastic coefficient C(md) of a cellulose ester film in the mechanical direction and photoelastic coefficient C(td) of the same in the transverse direction is $1\times10^{-9}$ to $1\times10^{-13}$ $Pa^{-1}$ and C(md)<C(td), (b) retardation $R_0$ within the plane of said cellulose film defined by Formula (I) is 20 to 70 nm, (c) retardation $R_t$ of said cellulose film in the thickness direction, defined by Formula (II) is 70 to 400 nm, and (d) dimensional variation ratio S(md) of film in the mechanical direction and dimensional variation ratio S(td) of film in the transverse direction prior to and after being allowed to stand at ambient conditions of 80° C. and 90 percent relative humidity for 50 hours are −1 to 1 percent, and |S(md)|>|S(td)|.

$$R_0=(nx-ny)\times d \quad \text{(I)}$$

$$R_t=\{(nx+ny)/2-nz\}\times d \quad \text{(II)}$$

wherein nx is the refractive index in the delayed phase axis direction (the transverse direction) within the film plane, ny is the refractive index in advanced phase axis direction, (mechanical direction), nz is the refractive index in the thickness direction of film, and d is a thickness of film.

DETAILED DESCRIPTION OF THE PRESENT INVENTION

Generally, liquid crystal display apparatuses exhibit viewing angle characteristics. When viewed from an angle with respect to the normal to the liquid crystal cell, a problem has occurred in which image contrast decreases. In order to solve the aforesaid problem, it is known that it is effective to arrange a phase difference film (an optical compensation film) having suitable retardation between the liquid crystal cell and the polarizer. Generally, it is preferable that retardation ($R_0$) in the in-plane direction is 20 to 70 nm, and retardation ($R_t$) in the depth direction is 70 to 400 nm.

When the retardation of cellulose ester film is controlled, the degree of substitution of employed cellulose ester and the type of substituents are critical. In the present invention, suitable retardation is possible for the optical compensation polarizing plate (the viewing angle compensation integral type polarizing plate) by employing cellulose ester which satisfies 2.55≦X+Y≦2.85 and 1.4≦X≦2.85, wherein X represents the degree of acetyl substitution and Y is the degree of substitution of a propionyl group and/or a butyryl group and by orienting the resulting film.

Further, in the present invention, it is possible to result in suitable retardation as the viewing angle compensation cellulose ester film by orienting cellulose ester film which comprises compounds exhibiting the degree of acetylation of cellulose ester of 59.0 to 61.5 percent and have at least two aromatic rings in an amount of 0.1 to 20 parts by weight with respect to 100 parts by weight of cellulose ester film.

Still further, in order to improve viewing angle characteristics of a liquid crystal display panel, known to be effective is to arrange a layer comprising rod-shaped or disc-shaped liquid crystal compounds in an optical compensation cellulose ester film having suitable phase difference. Namely, it is possible to further improve the viewing angle characteristics by employing an optically anisotropic layer in which a nematic hybrid structure is formed by orienting rod-shaped liquid crystal molecules or by arranging a disc-shaped liquid crystal molecule layer.

In order to improve the viewing angle characteristics of liquid crystal display apparatuses, from the viewpoint of minimizing light leakage, when black is displayed, it is critical that the delayed phase axis of the optical compensation cellulose ester film and the transmission axis of the polarizer are substantially parallel or at right angles to each other. Further, as noted above, it is possible to improve the viewing angle characteristics by applying optically anisotropic layer comprising liquid crystal compounds onto a cellulose ester film. In such a case, it is markedly preferable that the delayed phase axis of the cellulose ester film and the delayed phase axis of the optically anisotropic layer are at right angles to each other.

When industrial mass-production of liquid crystal display apparatuses is considered, in order to form an optically anisotropic layer comprising optically anisotropic compounds by coating liquid crystal compounds and allowing those to be oriented, it is required that the cellulose ester film is subjected to rubbing in a rolled state. However, it is very difficult to carry out rubbing in the transverse direction, while it is much easier to carry out rubbing in the mechanical direction (the direction of movement). On the other hand, in order that this and the delayed phase of the cellulose ester film are at right angles to each other, it is preferable that orientation is carried out in the transverse direction. When polarizers are prepared employing orientation, orientation at mechanical direction is preferred. As a result, the absorption axis of the polarizer is in the mechanical direction while the transmission axis is in the transverse direction. As a result, it is preferable that the delayed phase axis of the viewing angle compensation cellulose ester film and the transmission axis of the polarizer are substantially parallel.

Further, in order to improve the viewing angle, it is preferable that nematic type polymer liquid crystal compounds are incorporated into the optically anisotropic layer so that a structure is formed in which hybrid orientation is achieved in which the pre-tilt angle of the liquid crystal molecules varies in the depth direction.

The variation of viewing angle characteristics over time storage is due to the variation of retardation over time. Based on investigation results obtained by the inventors of the present invention, special attention was paid to anisotropy of the photoelastic coefficient and dimensional variation, whereby the present invention was achieved. It is considered that the photoelastic coefficient responds to the retardation variation for stress, and the dimensional variation is the value relating to the magnitude of stress applied to film over time. For example, when a cellulose ester film is oriented in the transverse (td) direction, the absolute value of dimensional variation in the transverse direction over time is greater than that in the mechanical (md) direction, and the photoelastic coefficient in the transverse direction further increases. It is considered that the greater the photoelastic efficient and the absolute value of the dimensional variation, the greater the variation of retardation becomes. The td direction is subjected to greater variation due to synergistic effects of these two, compared to the md direction. As a result, the variation of viewing angle over time increases, resulting in a film with insufficient durability. In the present invention, durability of viewing angle compensation function was improved by decreasing the absolute value of dimensional variation in the direction of greater photoelastic coefficient in such a manner that strain remaining in the orientation direction was relaxed, for example, by appropriately applying heat after orientation.

Further, substantially parallel, as described in the present invention, means that deviation from the parallel is allowed in the range which results in no problems, and the angle of the axis of a subject is within approximately ±10 degrees, is preferably within ±3 degrees, and is more preferably ±1 degree. On the other hand, at right angles to each other means that a range near 90 degrees is allowed, and that range is preferably about 80 to about 100 degrees, is more preferably 85 to 95 degrees, and is most preferably 90 degrees.

The present invention will now be detailed.

(Casting of Cellulose Ester Film)

A casting method of the cellulose ester film according to the present invention will be described (as a representative example, using a solution extrusion casting method).

(1) Dissolving Process:

In a dissolving tank, a dope is prepared by dissolving, while stirring, cellulose ester in organic solvents comprised of good solvents for cellulose ester as a main component. Dissolution is carried out employing various dissolving methods in which dissolution is carried out at a temperature lower than the boiling point of the main solvent under normal pressure, dissolution is carried out at a temperature higher than the boiling point of the main solvent under a pressurized state, dissolution is carried out while chilled at 0° C. or lower, or dissolution is carried out under high pressure. In the present invention, any of these methods may be preferably employed. However, the high temperature dissolving method is more preferably employed in which dissolution is carried out at a temperature higher than the main solvent under a pressurized state. After dissolution, the resulting dope is filtered employing a filter, defoamed and conveyed to the subsequent process employing a pump.

Into a dope, it is possible to incorporate additives such as plasticizers, antioxidants, UV absorbers, matting agents, or retardation increasing agents which exhibit various desirable functions. These additives may be added together with cellulose ester and solvents when the dope is prepared, or may be added during or after preparation of the dope. Further, added may be thermal stabilizers such as salts of alkaline earth metals, antistatic agents, fire retardants, slipping agents, and lubricants.

(2) Extrusion Process: The dope is conveyed to a pressure die through a pressure type quantitative gear pump, and is extruded at the extrusion position onto a specular surface metal endless belt which conveys the extrusion or a revolving metal drum (hereinafter referred simply to as a metal support) from the pressure die. In an extrusion apparatus employing a die, a pressure die is preferred in which the slit shape of a mouth ring portion can be controlled and which is capable of easily making the web thickness uniform. Pressure dies include a coat hanger type and a T die, which are preferably employed. In order to increase the casting rate, two pressure dies may be arranged above the metal support and multilayer coating may be carried out while dividing the dope into several portions.

(3) Solvent Evaporation Process: The web on the metal support is heated so that organic solvents are evaporated. Methods to evaporate organic solvents include a method in which air is blown from the web side and/or heat is transmitted from the back surface of the metal support employing a liquid, and a method in which heat is transmitted from the front and back surfaces employing radiated heat. Any of these methods may preferably be employed.

(4) Peeling Process: A web which has been subjected to vaporization of organic solvents on the metal support is peeled from the metal support. The peeled web is conveyed to the following drying process. At the time of peeling, when the residual solvent amount (described below) of the web is excessive, peeling becomes difficult. On the contrary, when the web is peeled after being sufficiently dried on the metal support, a part of the web occasionally separates during peeling.

Methods to increase the casting rate include gel casting which makes it possible to peel in the presence of a large amount of residual solvents, a method in which poor solvents for cellulose ester are added to a dope and after extrusion of the dope, the resulting web is gelled, and a method in which the temperature of the metal support is lowered to result in gelling. When gelling is carried out on the metal support, the resulting layer strength increases. As a result, it is possible to carry out peeling even though solvents remain in relatively large amounts. Consequently, it is possible to carry out peeling earlier to enable an increase in a casting rate. In the case in which peeling is carried out with an excessive amount of solvents, when the web is excessively soft, flatness is degraded during peeling, and wrinkling and longitudinal streaking tend to form due to peeling tension. As a result, the residual solvent amount at peeling is determined while taking into account the economic rate and the resulting quality. In the present invention, it is preferable that peeling is carried out at a residual solvent amount of 10 to 120 percent by weight.

(5) Drying Process:

A web is dried employing a drying apparatus in which the web is conveyed while alternatively passed through guide rollers arranged in zigzag and/or a tenter drying apparatus in which the web is conveyed while both edges of the web are gripped by clips. A drying means is generally such that hot air is blown onto both sides of the web, but a means is possible in which instead of blown air, heating is carried out by exposure to microwaves. Excessively rapid drying tends to degrade flatness of the finished film. Over the entire drying process, drying temperature is preferably 40 to 250° C., and is more preferably 70 to 180° C. Drying temperature, drying air amount, and drying time vary depending on solvents employed. Drying conditions may be appropriately chosen corresponding to types and combinations of the employed solvents.

After peeling from the metal support surface, in the drying process, the web tends to be subjected to contraction in both directions due to evaporation of solvents. When drying is carried out more rapidly at higher temperature, the resulting contraction increases. It is preferable to carry out drying while minimizing the contraction as to result in the desired flatness of the finished film. From this viewpoint, a method (a tenter system) is preferred in which in the entire drying process or one part of the drying process, drying is carried out while holding both edges of the web clipped in the transverse direction, as shown, for example in Japanese Patent Publication Open to Public Inspection No. 62-46625. In such a case, it is possible to control retardation by controlling the orientation factor of the web, the residual solvent amount, and the temperature.

In the present invention, it was possible to provide suitable retardation for viewing angle compensation by setting, for example, the residual solvent amount of film at 5 to 30 percent by weight, the temperature during film orientation at 60 to 140° C., and the orientation factor at 1.0 to 2.0, while orienting in the transverse direction employing a tenter. Further, at that time, the transverse direction (the td direction) of the film was the nx direction, the mechanical direction was the ny direction, and the thickness direction was the nz direction. Further, at the same time, anisotropy was given to the photoelastic coefficient and it was possible to control the characteristics to satisfy the formula of $C(md) < C(td)$.

At the time, the film is in such a state that residual strain in the td direction is greater than that in the md direction and exhibits the characteristic of $|S(md)|<|S(td)|$. Accordingly, after transverse orientation employing tenters, in order to relax the residual strain in the td direction, the film was dried at 40 to 120° C. while conveyed employing rollers under a tension of 50–200 N. As a result, it was possible to prepare an optical compensation film exhibiting $|S(md)|>|S(td)|$. At that time, a critical condition is to enable relaxation in the td direction. For example, by repeated conveyance employing at least 400 rollers under the aforesaid tension at the aforesaid temperature, it was possible to achieve characteristic conditions at the aforesaid dimensional variation ratio.

Further the optical compensation film is preferably has characteristics of $C(td)\times|S(td)|<5.0\times10^{-14}$, and further $C(td)\times|S(td)|<C(md)\times|S(md)|$ in view of permanence of viewing angle.

C(td) and C(md) are a photoelastic coefficient in the transverse direction and mechanical direction, respectively, in $Pa^{-1}$, S(td) is a dimensional variation ratio in the transverse direction of the cellulose ester film prior to and after being allowed to stand at ambient conditions of 80° C. and 90 percent relative humidity for 50 hours, that is defined as $(w-w_0)/w_0\times100$ (%), wherein $w_0$ is a width of the cellulose ester film prior to the above processing and w is a width of the cellulose ester film after the above processing. S(md) is a dimensional variation ratio in the mechanical direction obtained similar to S(td).

(6) Winding Process

The dried web is wound as film. By specifying the residual solvent amount at the completion of drying to 2 percent by weight or less and preferably 0.4 percent by weight or less, it is possible to prepare film with excellent dimensional stability. Employed as winding methods are those which employ commonly used winders. Methods include ones such as a constant torque method, a constant tension method, a taper tension method, or an interior stress constant program tension control method, which control tension. Any of these methods may be chosen and employed.

The residual solvent amount can be expressed by the formula described below.

$$\text{Residual solvent amount (in percent by weight)}=\{(M-N)/N\}\times100$$

wherein M is the weight of a web at an arbitrary point and N is the weight of the web having a weight of M which is dried at 110° C. for three hours.

The thickness of a cellulose ester film varies depending on its intended use. However, from the viewpoint of a decrease in thickness of liquid crystal display apparatuses, the thickness of the finished film is preferably 10 to 75 μm, is more preferably 10 to 60 μm, and is most preferably 10 to 40 μm. When the thickness is excessively reduced, for example, necessary strength as a polarizing plate protective film is occasionally not achieved. On the other hand, when the thickness is excessively increased, the advantage of a decrease in thickness is lost compared to the conventional cellulose ester film. It is preferable that film thickness is adjusted by controlling the dope concentration, the liquid amount conveyed by the pump, the slit gap of the mouth of the die, the extrusion pressure at the die, and the speed of a metal support so that the desired thickness is achieved. Further, as a means to achieve uniform thickness, it is preferable to adjust the thickness in such a manner that by employing a film thickness monitoring means, programmed feedback information is subjected to feedback to each of the aforementioned apparatuses.

Through the process from immediately after extrusion to drying in the solution extrusion casting method, ambient air may be employed in the drying apparatus. However, drying may also be carried out in an ambience of inert gases such as nitrogen gas or carbon dioxide gas.

(Cellulose Ester Film and Its Composition)

Cellulose as a raw material of cellulose ester employed in the present invention is not particularly limited. Listed as raw materials may be cotton linter, wood pulp and kenaf. Further, cellulose esters which are prepared by employing these may be mixed at an optional ratio and then used.

In order to prepare film which exhibits excellent mechanical strength, the number average molecular weight of cellulose ester employed in the present invention is preferably 60,000 to 300,000, and is more preferably 80,000 to 200,000.

The number average molecular weight of cellulose ester is determined employing high speed liquid chromatography under the conditions described below.

Solvent: acetone
Column: MPWx1 (manufactured by TOSOH Corp.)
Sample concentration: 0.2 weight/volume percent
Flow rate: 1.0 ml/minute
Sample injection volume: 300 μl
Standard sample: methyl polymethacrylate (Mw=188,200)
Temperature: 23° C.

Cellulose ester employed in the present invention is prepared by acylating cellulose raw materials. When acylating agents are acid anhydrides (such as acetic anhydride, propionic anhydride, or butyric anhydride), organic acids such as acetic acid and organic solvents such as methylene chloride are employed and reaction is allowed to proceed employing protonic catalysts such as sulfuric acid. When acylating agents are acid chlorides (such as $CH_3COCl$, $C_2H_5COCl$, or $C_3H_7COCl$), reaction is allowed to proceed employing basic compounds such as amines as a catalyst. Specifically, it is possible to achieve the synthesis based on the method described in Japanese Patent Publication Open to Public Inspection No. 10-45804.

Cellulose ester is prepared by allowing an acyl group to react with hydroxyl group(s) of cellulose molecules. A cellulose molecule is comprised of the linkage of many glucose units, while the glucose unit comprises three hydroxyl groups. The degree of substitution refers to the number of acyl groups which are introduced into the aforesaid hydroxyl group.

Cellulose esters employed in the present invention include those such as cellulose acetate propionate, cellulose acetate butyrate, or cellulose acetate propionate butyrate, in which, other than the acetyl group, a propionyl group or a butyryl group is linked. Incidentally, the butyryl group includes an iso-butyryl group other than an n-butyryl group. Cellulose acetate propionate which exhibits a greater degree of substitution of the propionyl group is useful as a film for liquid crystal display apparatuses due to its excellent water resistance.

It is possible to determine the degree of substitution of an acyl group in accordance with ASTM-D817-96.

When the retardation as well as the photoelastic coefficient of cellulose ester films is controlled, the degree of substitution of the employed cellulose ester and the type of substituents become critical factors. In the present invention, when $2.3 \leq X+Y \leq 2.85$ as well as $1.4 \leq X \leq 2.85$ is satisfied, wherein X represents the degree of acetyl substitution and Y represents the degree of substitution by a propionyl group and/or a butyryl group, suitable retardation as a viewing angle compensation polarizing plate (viewing angle compensation integral type polarizing plate) tends to be obtained.

Further, in the present invention, it is possible to prepare film exhibiting suitable retardation and photoelastic coefficient as the viewing angle compensation cellulose ester film by preparing it to exhibit a degree of acetylation of 59.0 to 61.5 percent, and to comprise compounds having at least two aromatic rings in an amount of 0.01 to 20 parts by weight with respect to 100 parts by weight of cellulose ester film.

(Additives of Cellulose Ester Film (Support))

In order to prepare a cellulose ester film which incorporates compounds having at least two aromatic rings and at least two aromatic rings which exhibit a planar structure, the aforesaid compounds and cellulose ester are incorporated into a dope together with organic solvents, and the resulting mixture is cast employing a solution extrusion casting method.

Compounds which have at least two aromatic rings and in which at least two aromatic rings have a planar structure may include those in which two aromatic rings are positioned nearly on the same plane. Namely, it is preferable that the number of π electrons is 5 to 10 while totaling the π electrons of two aromatic rings, aromatic heterocyclic rings, or aromatic rings including linking groups linking them.

Further, the number of aromatic rings incorporated into the aforesaid compounds is preferably 2 to 20, is more preferably 2 to 12, and still more preferably 2 to 8. The aforesaid aromatic rings include an aromatic hydrocarbon ring as well as an aromatic heterocyclic ring. The aforesaid aromatic hydrocarbon ring is most preferably a 6-membered ring (namely, a benzene ring). The aromatic heterocyclic ring is generally an unsaturated heterocyclic ring. The aromatic heterocyclic ring is preferably a 5-membered, 6-membered, or 7-membered ring, and is more preferably a 5-membered or 6-membered ring. The aromatic heterocyclic ring generally has the maximum number of double bonds. Hetero atoms are preferably a nitrogen atom, an oxygen atom and a sulfur atom, and of these, nitrogen atoms are particularly preferred.

Examples of aromatic heterocyclic rings include a furan ring, a thiophene ring, a pyrrole ring, an oxazole ring, an iso-oxazole ring, a thiazole ring, an isothiazole ring, an imidazole ring, a pyrazole ring, a furazane ring, a triazole ring, a pyran ring, a pyridine ring, a pyridazine ring, a pyrimidine ring, a pyrazine ring, and a 1,3,5-triazine ring. Preferably as aromatic rings are a benzene ring, a furan ring, a thiophene ring, a pyrrole ring, an oxazole ring, a thiazole ring, an imidazole ring, a triazole ring, a pyridine ring, a pyrimidine ring, a pyrazine ring, and a 1,3,5-triazine ring.

The bonding relationship of at least two aromatic rings may be classified into the following; (however, it is impossible to form a Spiro bond due to the aromatic ring)

(a) a case of forming a condensed ring (b) a case of direct bonding through a single bond (c) a case of bonding via a linking group (d) a case of bonding via a linking group having π electrons However, in the case of (b) or (c), it is necessary that two aromatic rings have planar structures.

Examples of condensed rings(condensed rings of at least two aromatic rings) of (a) include an indene ring, a naphthalene ring, an azulene ring, a fluorene ring, a phenanthrene ring, an anthracene ring, an acenaphthylene ring, a biphenylene ring, a naphthacene ring, a pyrene ring, an indole ring, an isoindole ring, a benzofuran ring, a benzothiophene ring, an indolizine ring, a benzoxazole ring, a benzothiazole ring, a benzimidazole ring, a benzotriazole ring, a purine ring, an indazole ring, a chromene ring, a quinoline ring, an isoquinoline ring, a quinolidine ring, a quinazoline ring, a cinnoline ring, a quinoxaline ring, a phthalazine ring, a pteridine ring, a carbazole ring, an acridine ring, a phenanthridine ring, a xanthene ring, a phenazine ring, a phenothiazine ring, a phenoxathiin ring, a phenoxazine ring, and a thianthrene ring. Of these, preferred are a naphthalene ring, an azulene ring, an indole ring, a benzoxazole ring, a benzothiazole ring, a benzimidazole ring, a benzotriazole ring, and a quinoline ring.

The single bond of (b) is preferably a bond between carbon atoms of two aromatic rings. An aliphatic ring or a non-aromatic heterocyclic ring may be formed between two aromatic rings by bonding two aromatic rings using at least two single bonds.

The linking group or π electron containing a linking group of (c) or (d) preferably bonds to the carbon atom of two aromatic rings. The linking group is preferably an alkylene group, an alkenylene group, an alkynylene group, —CO—, —O—, —NH—, —S—, or combinations thereof. Examples of linking groups comprised of some combinations are described below. The right and left relationship of the examples of linking groups described below may be reversed. Examples include —CO—O—, —CO—NH—, -alkylene-O—, —NH—CO—NH—, —NH—CO—O—, —O—CO—O—, —O-alkylene-O—, —CO-alkenylene-, —CO-alkenylene-NH—, —CO-alkenylene-O—, -alkylene-CO—O-alkylene-O—CO-alkylene-, —O-alkylene-CO—O-alkylene-O—CO-alkylene-O—, —O—CO-alkylene-CO—O—, —NH—CO-alkenylene-, and —O—CO-alkenylene. Particularly, —CO— and alkenylene are preferred as a group which directly bonds to an aromatic ring or an aromatic heterocyclic ring.

Aromatic rings as well as linking groups may have substituent(s). However, it is required that the substituents do not result in a structure which results in no steric hindrance, but namely one which results in a planar structure. Types and positions of the substituents result in the steric hindrance. Of the types of substituents, dimensionally bulky substituents(e.g. a tertiary alkyl group) tend to result in such steric hindrance. In regard to the positions of substituents, it is preferable that a position adjacent to the bond between aromatic rings (in the case of a benzene ring, being an ortho position) is avoided, since, when substituted, the aforesaid steric hindrance tends to occur.

Examples of substituents include a halogen atom (F, Cl, Br, and I), a hydroxyl group, a carboxyl group, a cyano group, an amino group, a nitro group, a sulfo group, a carbamoyl group, a sulfamoyl group, a ureido group, an alkyl group, an alkenyl group, an alkynyl group, an aliphatic acyl group, an aliphatic acyloxy group, an alkoxyl group, an alkoxycarbonyl group, an alkoxycarbonylamino group, an alkylthio group, an alkylsulfonyl group, an aliphatic amide group, an aliphatic sulfonamide group, an aliphatic substituted amino group, an aliphatic substituted carbamoyl group, an aliphatic substituted sulfamoyl group, an aliphatic substituted ureido group and a non-aromatic heterocyclic group.

The number of carbon atoms of an alkyl group is preferably 1 to 8. A chain alkyl group is more preferable than a cyclic alkyl group, but a straight chain alkyl group is particularly preferred. The alkyl group may further have substituent(s) (e.g. a hydroxyl group, a carboxyl group, an alkoxyl group, and an alkyl substituted amino group). Examples of alkyl groups (including substituted alkyl groups) include a methyl group, an ethyl group, an n-butyl group, an n-hexyl group, a 2-hydroxyethyl group, a 4-carboxybutyl group, a 2-methoxyethyl group, and a 2-diethylaminoethyl group. The number of carbon atoms of the alkenyl group is preferably 2 to 8. A chain alkenyl group is more preferable than a cyclic alkenyl group, but a straight chain alkenyl group is particularly preferred. The alkenyl group may further have substituent(s). Examples of alkenyl groups include a vinyl group as well as a 1-hexenyl group. The number of carbon atoms of the alkynyl group is preferably 2 to 8. A chain alkynyl group is more preferable than a cyclic alkynyl group, while a straight chain alkynyl group is particularly preferred. The alkynyl group may further have substituent(s). Examples of alkynyl groups include an ethynyl group, a 1-butynyl group, and a 1-hexynyl group.

The number of carbon atoms of the aliphatic acyl group is preferably 1 to 10. Examples of aliphatic acyl groups include an acetyl group, a propanoyl group, and a butanoyl group. The number of carbon atoms of the aliphatic acyloxy group is preferably 1 to 10. Examples of the aliphatic acyloxy group include an acetoxy group. The number of carbon atoms of the alkoxy group is preferably 1 to 8. The alkoxy group may further have substituent(s) (e.g. an alkoxyl group). Examples of the alkoxy groups (including an substituted alkoxy group) include a methoxy group, an ethoxy group, a butoxy group, and a methoxyethoxy group. The number of carbon atoms of the alkoxycarbonyl group is preferably 2 to 10. Examples of alkoxycarbonyl groups include a methoxycarbonyl group and an ethoxycarbonyl group. The number of carbon atoms of the alkoxycarbonylamino group is preferably 2 to 10. Examples of alkoxycarbonylamino groups include a methoxycarbonylamino group and an ethoxycarbonylamino group.

The number of carbon atoms of the alkylthio group is preferably 1 to 12. Examples of alkylthio groups include a methylthio group, an ethylthio group, and an octylthio group. The number of carbon atoms of the alkylsulfonyl group is preferably 1 to 8. Examples of alkylsulfonyl groups include a methanesulfonyl group and an ethanesulfonyl group. The number of carbon atoms of the aliphatic amide group is preferably 1 to 10. Examples of the aliphatic amide group include an acetamide group. The number of carbon atoms of the aliphatic sulfonamide group is preferably 1 to 8. Examples of the aliphatic sulfonamide groups include a methanesulfonamide group, a butanesulfonamide group, and an n-octanesulfonamide group. The number of carbon atoms of the aliphatic substituted amino group is preferably 1 to 10. Examples of the aliphatic substituted amino groups include a dimethylamino group, a diethylamino group, and a 2-carboxyethylamino group. The number of carbon atoms of the aliphatic substituted carbamoyl group is preferably 2 to 10. Examples of the aliphatic substituted carbamoyl groups include a methylcarbamoyl group and a diethylcarbamoyl group. The number of carbon atoms of the aliphatic substituted sulfamoyl group is preferably 1 to 8. Examples of the aliphatic substituted sulfamoyl groups include a methylsulfamoyl group and a diethylsulfamoyl group. The number of carbon atoms of the aliphatic substituted ureido group is preferably 2 to 10. Examples of the aliphatic substituted ureido group include a methylureido group. Examples of the non-aromatic heterocyclic groups include a piperidino group and a morpholino group.

The molecular weight of these compounds is preferably 300 to 800, while the boiling point is preferably 260° C. or higher. It is possible to determine the boiling point employiong a commercially available measurement apparatus (for example, TG/DTA100, manufactured by Seiko Denshi Kogyo Co.). Specific examples are shown below.

A-1

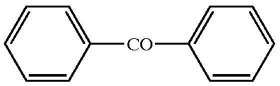

A-2

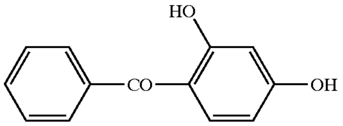

A-3

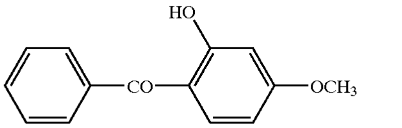

A-4

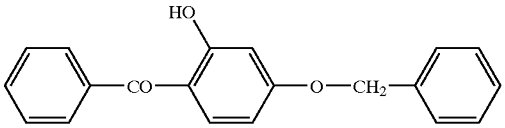

A-5

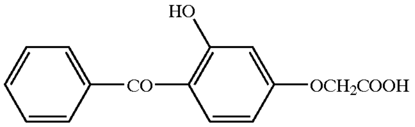

A-6

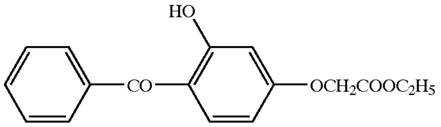

A-7

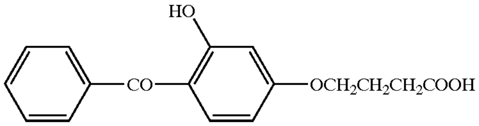

A-8

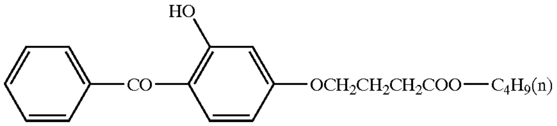

A-9

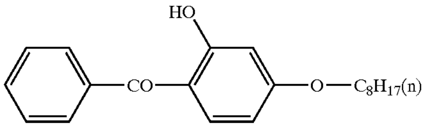

-continued
A-10
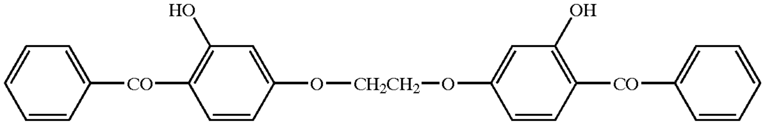
A-11
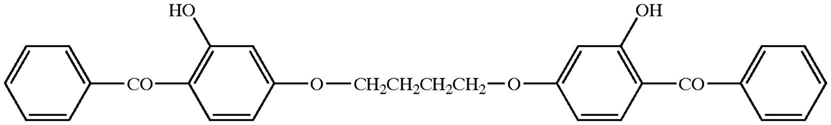
A-12
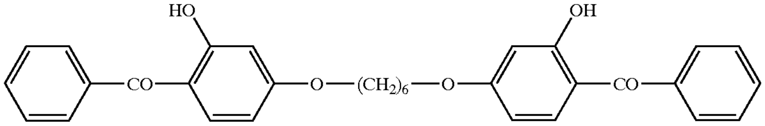
A-13
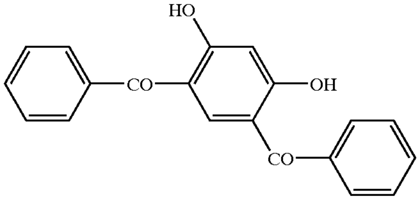
A-14
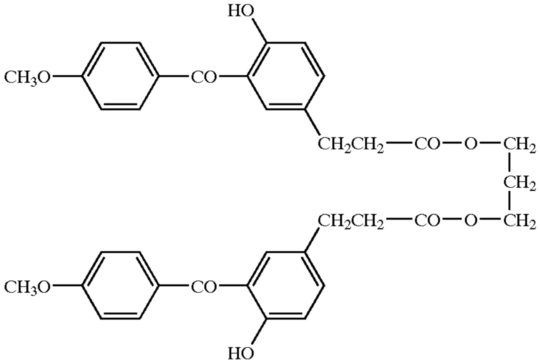
A-15
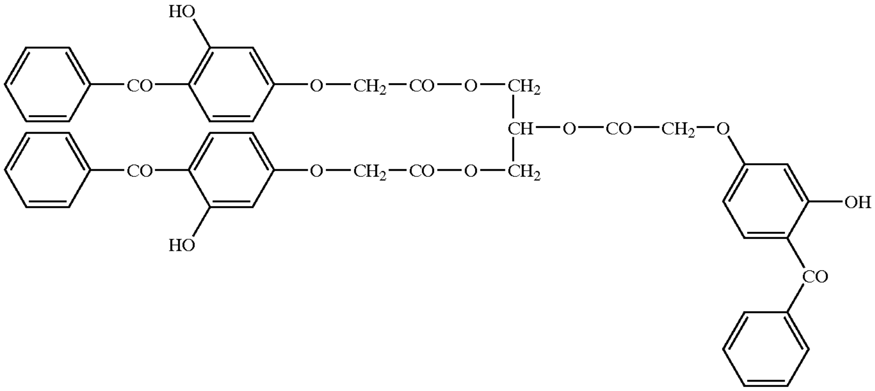
A-16
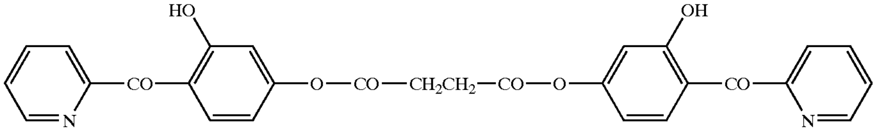
A-17
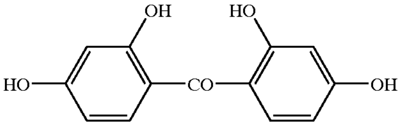
A-18
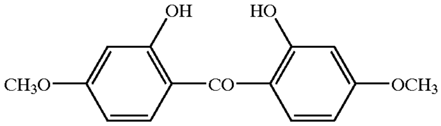
A-19
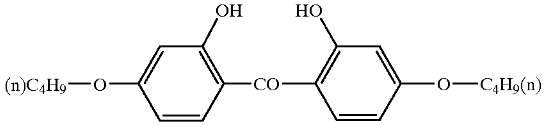

-continued
A-20
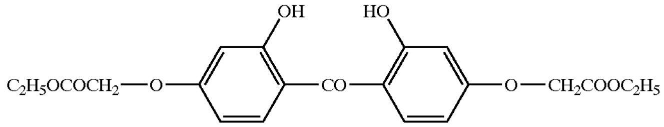
A-21
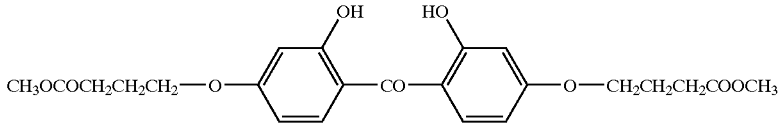
A-22
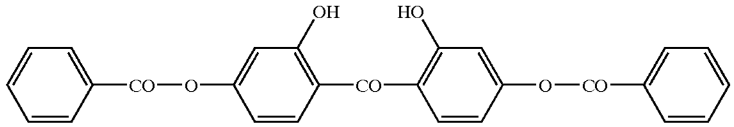
A-23
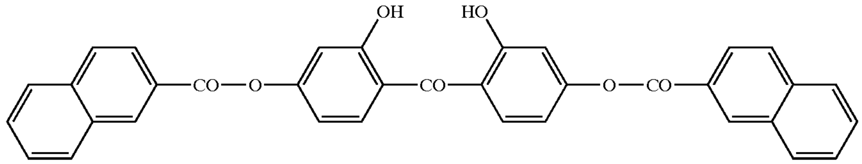
A-24
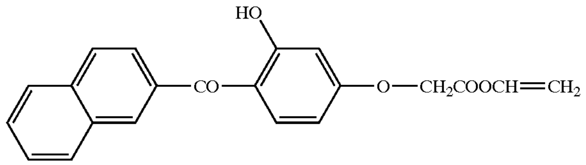
A-25
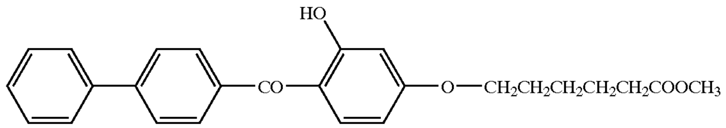
A-26
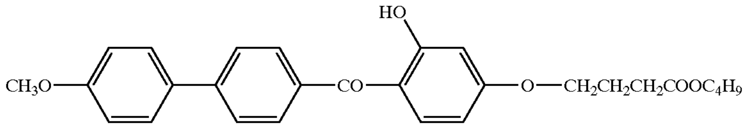
A-27
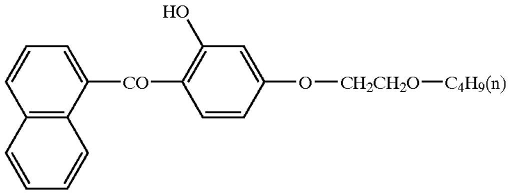
A-28
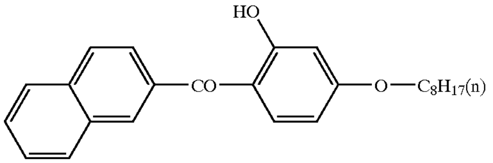
A-29
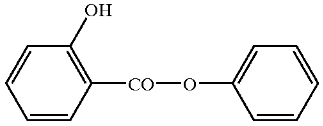
A-30
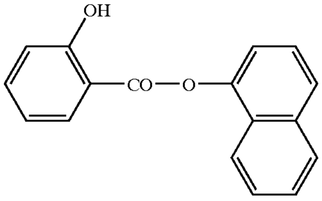
A-31
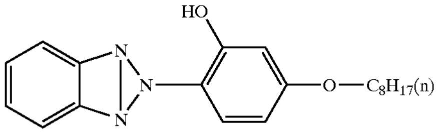
A-32
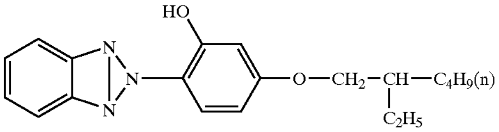

-continued
A-33
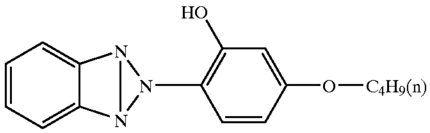
A-34
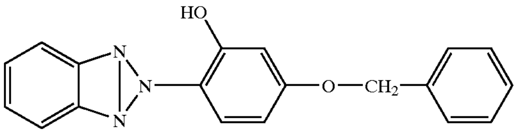
A-35
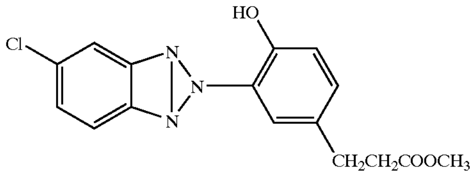
A-36
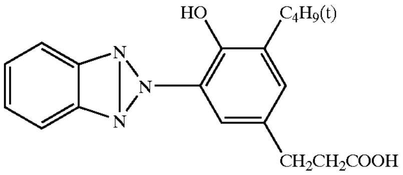
A-37
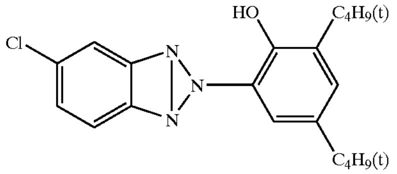
A-38
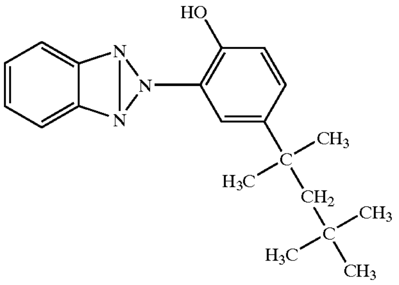
A-39
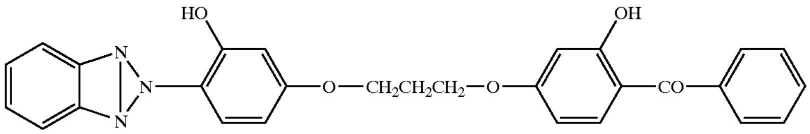
A-40
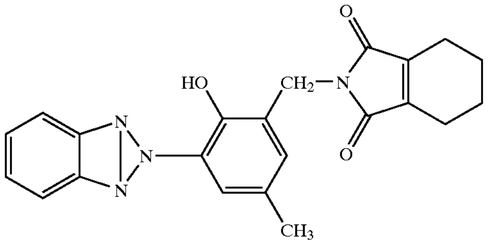
A-41
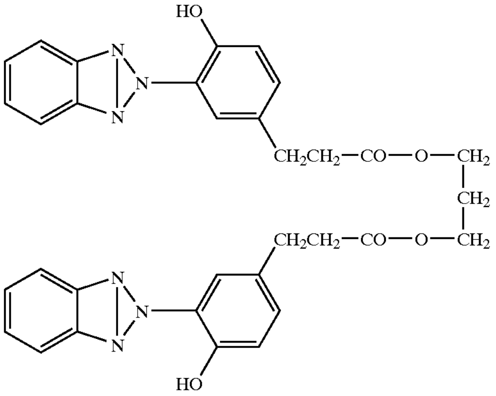
A-42
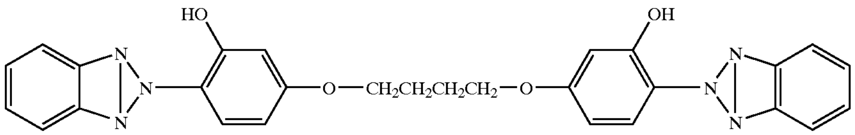
A-43
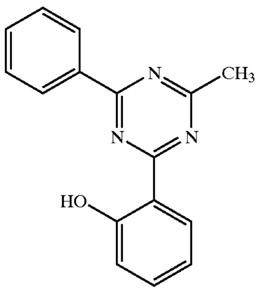
A-44
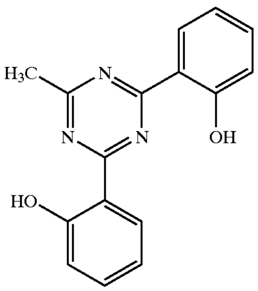

-continued
A-45
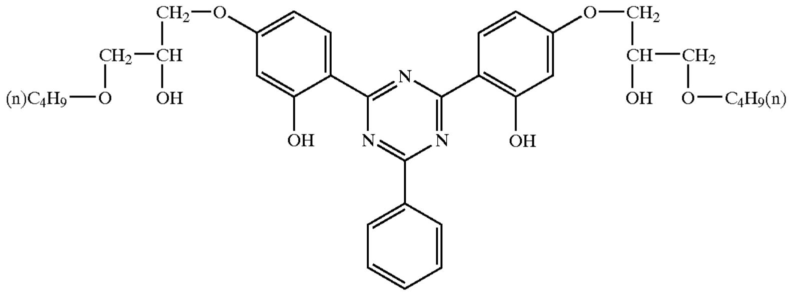
A-46
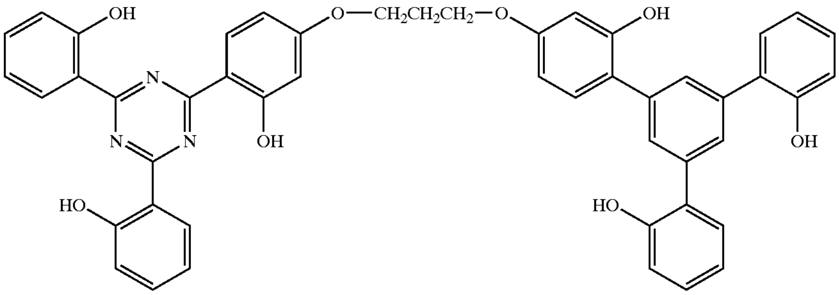
A-47
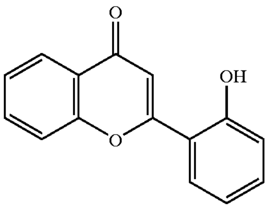
A-48
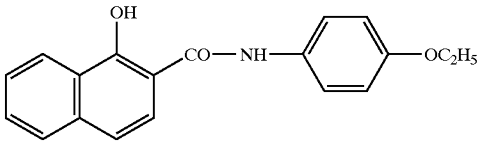
A-49
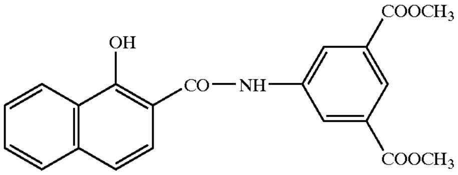
A-50
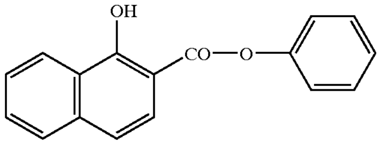
A-51
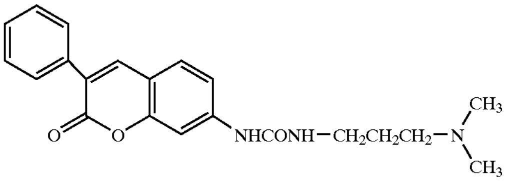
A-52
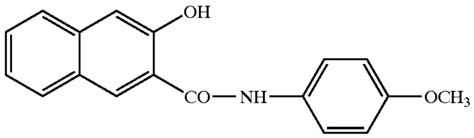
A-53
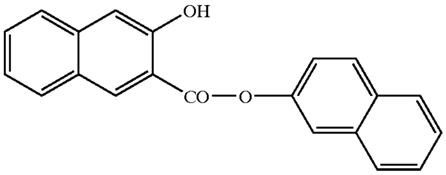
A-54
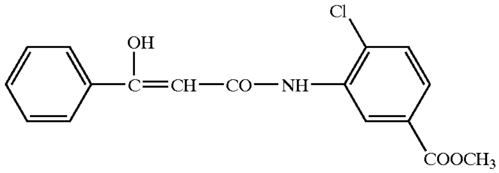
A-55
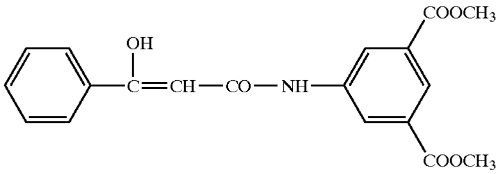
A-56
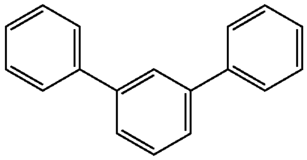

-continued
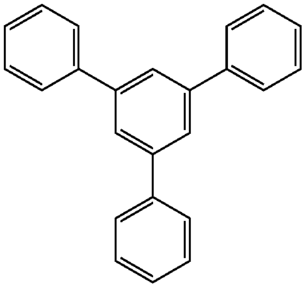
A-57
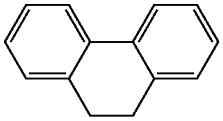
A-58
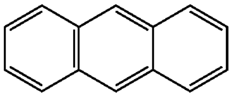
A-59
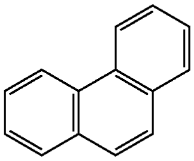
A-60
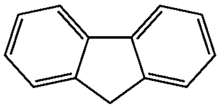
A-61
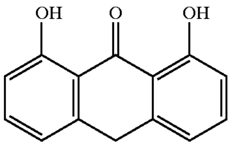
A-62
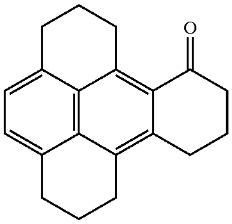
A-63
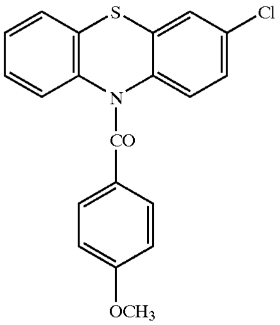
A-64
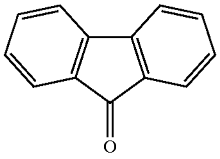
A-65
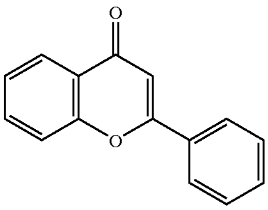
A-66
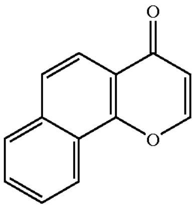
A-67
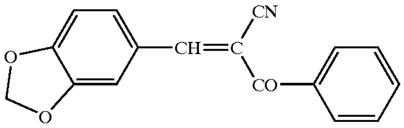
A-68
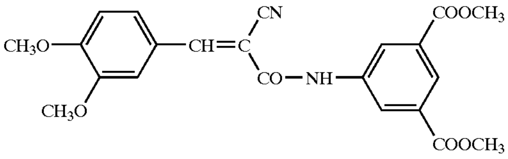
A-69
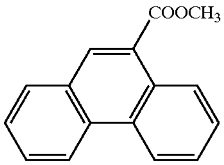
A-70

-continued
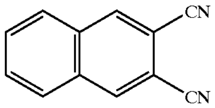
A-71
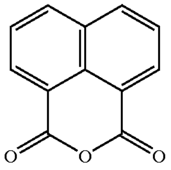
A-72
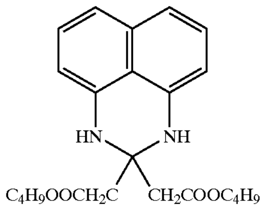
A-73
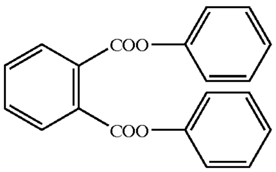
A-74
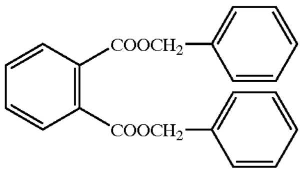
A-75
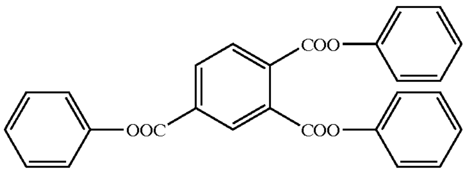
A-76
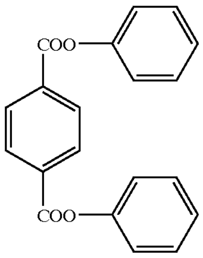
A-77
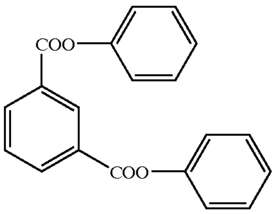
A-78
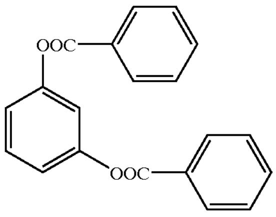
A-79
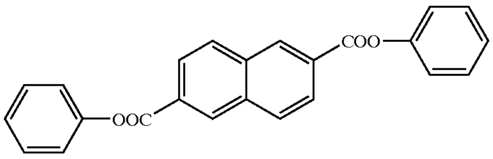
A-80
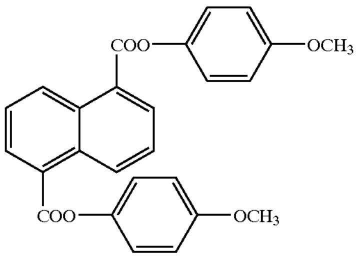
A-81
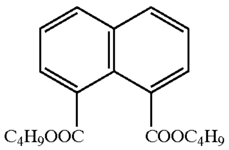
A-82

-continued
A-83
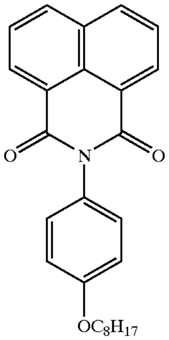
A-84
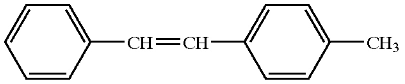
A-85
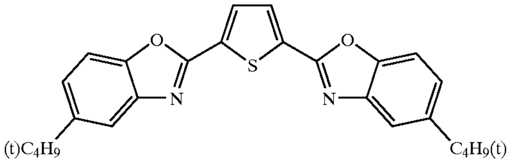
A-86
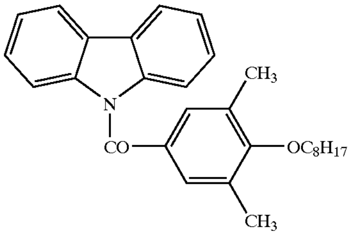
A-87
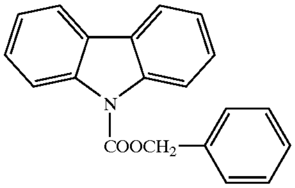
A-88
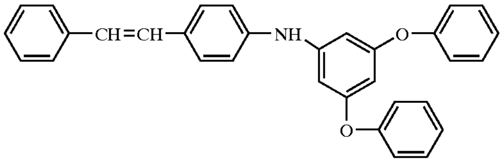
A-89
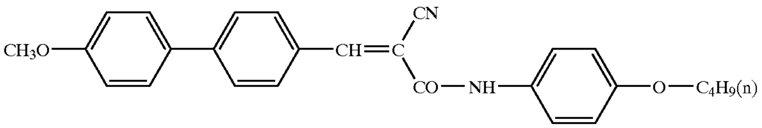
A-90
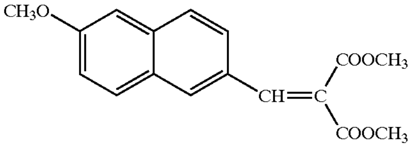
A-91
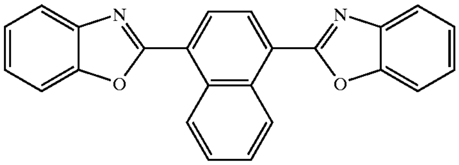
A-92
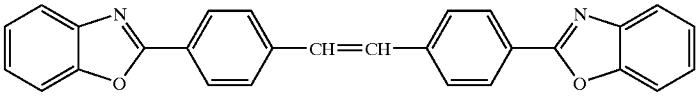
A-93
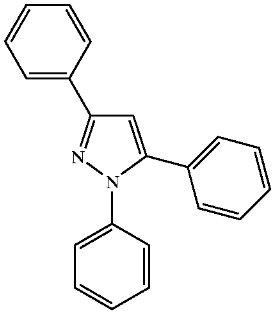

-continued

A-94

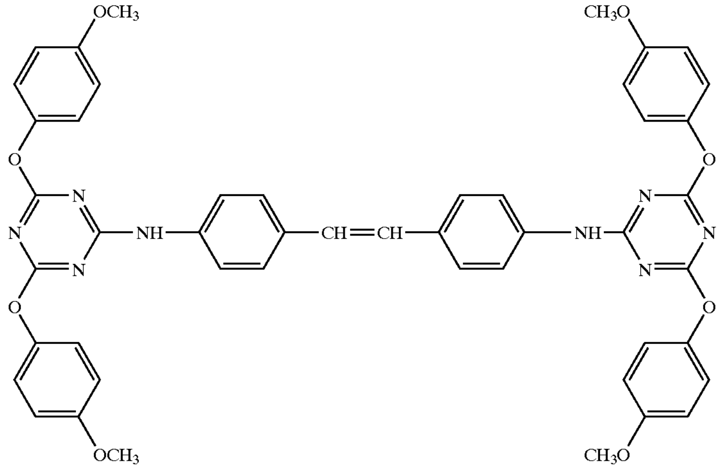

Further, other than those described above, preferably employed as compounds which have at least two aromatic rings in accordance with the present invention and in which at least two aromatics rings result in a planar structure are compounds having a triphenylene ring, represented by General Formula (1) described below.

General Formula (1)

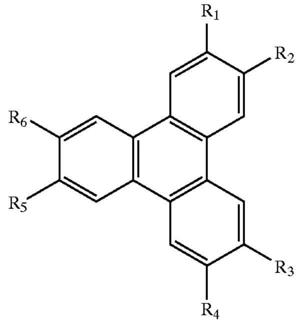

In General Formula (1), each of $R_1$, $R_2$, $R_3$, $R_4$, and $R_5$ independently is a hydrogen atom, a halogen atom, a nitro group, a sulfo group, an aliphatic group, an aromatic group, a heterocyclic group, —O—$R_{11}$, —S—$R_{12}$, —CO—$R_{13}$, —O—CO—$R_{14}$, —CO—O—$R_{15}$, —O—CO—O—$R_{16}$, —$BR_{17}R_{18}$, —$CONR_{19}R_{20}$, —$NR_{21}$—CO—$R_{22}$, —O—CO—$NR_{23}R_{24}$, —$SiR_{25}R_{26}R_{27}$, —O—$SiR_{28}R_{29}R_{30}$, —S—CO—$R_{31}$, —$OSO_2$—$R_{32}$, —SO—$R_{33}$, —$NR_{34}$—CO—$OR_{35}$, —$SO_2$—$R_{36}$ or —$R_{37}$—$CONR_{38}R_{39}$, and each of $R_{11}$, $R_{12}$, $R_{13}$, $R_{14}$, $R_{15}$, $R_{16}$, $R_{17}$, $R_{18}$, $R_{19}$, $R_{20}$, $R_{21}$, $R_{22}$, $R_{23}$, $R_{24}$, $R_{25}$, $R_{26}$, $R_{27}$, $R_{28}$, $R_{29}$, $R_{30}$, $R_{31}$, $R_{32}$, $R_{33}$, $R_{34}$, $R_{35}$, $R_{36}$, $R_{37}$, $R_{38}$, and $R_{39}$ independently is independently a hydrogen atom, an aliphatic group, or a heterocyclic group. $R_1$ and $R_2$, $R_3$ and $R_4$, or $R_5$ and $R_6$ may be joined together to form a ring.

$R_1$, $R_2$, $R_3$, $R_4$, $R_5$, and $R_6$ are preferably —O—$R_{11}$, —S—$R_{12}$, —O—CO—$R_{14}$, —OCO—$R_{16}$, —$NR_{17}R_{18}$, —$NR_{21}$—CO—$R_{22}$, or —O—CO—$NR_{23}R_{24}$, are more preferably —O—$R_{11}$, —S—$R_{12}$, —O—CO—$R_{14}$, —OCO—O—$R_{16}$, or —O—$CONR_{23}R_{24}$, and are still more preferably —$OR_{11}$ or —O—CO—$R_{14}$, and are most preferably —O—CO—$R_{14}$.

$R_{11}$, $R_{12}$, $R_{13}$, $R_{14}$, $R_{15}$, $R_{16}$, $R_{17}$, $R_{18}$, $R_{19}$, $R_{20}$, $R_{21}$, $R_{22}$, $R_{23}$, $R_{24}$, $R_{25}$, $R_{26}$, $R_{27}$, $R_{28}$, $R_{29}$, $R_{30}$, $R_{31}$, $R_{32}$, $R_{33}$, $R_{34}$, $R_{35}$, $R_{36}$, $R_{37}$, $R_{38}$, and $R_{39}$ are preferably hydrogen atoms, aliphatic groups, or aromatic groups. $R_{14}$ of —CO—$R_{14}$ is most preferably an aromatic group. Further, in General Formula (1), $R_1$, $R_2$, $R_3$, $R_4$, $R_5$, and $R_6$ are preferably the same group.

In the present invention, the aliphatic group refers to an alkyl group, an alkenyl group, an alkynyl group, a substituted alkyl group, a substituted alkenyl group, and a substituted alkynyl group. The alkyl group may be a cyclic group (such as a cycloalkyl group). Further, the alkyl group may be branched. The number of carbon atoms of the alkyl group is preferably 1 to 30, is more preferably 1 to 20, and is most preferably 1 to 10. Examples of alkyl groups include a methyl group, an ethyl group, an i-propyl group, a butyl group, an i-butyl group, an s-butyl group, a t-pentyl group, a hexyl group, an octyl group, a t-octyl group, a dodecyl group, and a tetracosyl group. The alkenyl group may be a cyclic group (such as a cycloalkenyl group). Further, the alkenyl group may be branched. The alkenyl group may have two or more double bonds.

The number of carbon atoms of the alkenyl group is preferably 2 to 30, is more preferably 2 to 20, and is most preferably 2 to 10. Examples of the alkenyl groups include a vinyl group, an allyl group, and a 3-heptenyl group. The alkynyl group may be a heterocyclic group (such as a cycloalkynyl group). Further, the alkynyl group may be branched. The alkynyl group may have at least two triple bonds. The number of carbon atoms of the alkynyl group is preferably 2 to 30, is more preferably 2 to 20, and is most preferably 2 to 10. Examples of alkynyl groups include an ethynyl group, a 2-prpynyl group, a 1-pentynyl group and a 2,4-octadynyl group.

Examples of substituents of the substituted alkyl group, the substituted alkenyl group, and the substituted alkynyl group include a halogen atom, a nitro group, a sulfo group, an aromatic group, a heterocyclic group, —O—$R_{41}$, —S—$R_{42}$, —CO—$R_{43}$, —O—CO—$R_{44}$, —CO—$R_{45}$, —O—CO—$OR_{46}$, —$NR_{47}R_{48}$, —CO—$NR_{49}R_{50}$, —$NR_{51}$—CO—$R_{52}$, —O—CO—$NR_{53}R_{54}$, —$SiR_{55}R_{56}R_{57}R_{58}$, and —O—$SiR_{59}R_{60}R_{61}R_{62}$. $R_{41}$, $R_{42}$, $R_{43}$, $R_{44}$, $R_{45}$, $R_{46}$, $R_{47}$, $R_{48}$, $R_{49}$, $R_{50}$, $R_{51}$, $R_{52}$, $R_{53}$, $R_{54}$, $R_{55}$, $R_{56}$, $R_{57}$, $R_{58}$, $R_{59}$, $R_{60}$, $R_{61}$, and $R_{62}$ are each independently a hydrogen atom, an aliphatic group, an aromatic group, or a heterocyclic group.

The alkyl portion of the substituted alkyl group is the same as the aforesaid alkyl group. Examples of the substituted alkyl groups include a benzyl group, a phenethyl group, a 2-methoxyethyl group, an ethoxymethyl group, a 2-(2-methoxyethoxy)ethyl group, a 2-hydroxyethyl group, a hydroxymethyl group, a 2-carboxyethyl group, a carboxymethyl group, an ethoxycarbonylmethyl group, a 4-acryloyloxybutyl group, a trichloromethyl group, and a perfluoropentyl group. The alkenyl portion of the substituted alkenyl group is the same as the aforesaid alkenyl group. Examples of the substituted alkynyl groups include a 4-butoxyphenylethynyl group, a 4-propylphenylethynyl group, and a trimethylsilylethynyl group.

In the present invention, the aromatic group refers to an aryl group and a substituted aryl group. The number of carbon atoms of the aryl group is preferably 6 to 30, is more preferably 6 to 30, and is most preferably 6 to 10. Examples of the aryl groups include a phenyl group, a 1-naphthyl group, and a 2-naphthyl group. Examples of the substituents of the substituted aryl group include a halogen atom, a nitro group, a sulfonic acid group, an aliphatic group, an aromatic group, a heterocyclic group, —O—$R_{71}$, —S—$R_{72}$, —CO—$R_{73}$, —O—CO—$R_{74}$, —CO—O—$R_{75}$, —O—CO—O—$R_{76}$, —$NR_{77}R_{78}$, —CO—$NR_{79}R_{80}$, —$NR_{18}$—CO—$R_{82}$, —O—CO—$NR_{83}R_{84}$, —$SiR_{85}R_{86}R_{87}R_{88}$, and —O—$SiR_{89}R_{90}R_{91}R_{92}$.

Each of $R_{71}$, $R_{72}$, $R_{73}$, $R_{74}$, $R_{75}$, $R_{76}$, $R_{77}$, $R_{78}$, $R_{79}$, $R_{80}$, $R_{81}$, $R_{82}$, $R_{83}$, $R_{84}$, $R_{85}$, $R_{86}$, $R_{87}$, $R_{88}$, $R_{89}$, $R_{90}$, $R_{91}$, and $R_{92}$ independently is a hydrogen atom, an aliphatic group, an aromatic group, or a heterocyclic group.

The aryl portion of the substituted aryl group is the same as the aforesaid aryl group. Examples of substituted aryl groups include a p-biphenyl group, a 4-phenylethynylphenyl group, a 2-methoxyphenyl group, a 3-methoxyphenyl group, a 4-methoxyphenyl group, a 2-ethoxyphenyl group, a 3-ethoxyphenyl group, a 4-ethoxyphenyl group, a 2-propoxyphenyl group, a 3-propoxyphenyl group, a 4-propoxyphenyl group, a 2-butoxyphenyl group, a 3-butoxyphenyl group, a 4-butoxyphenyl group, a 2-hexyloxyphenyl group, a 3-hexyloxyphenyl group, a 4-hexyloxyphenyl group, a 2-octyloxyphenyl group, a 3-octyloxyphenyl group, a 4-octyloxyphenyl group, a 2-dodecyloxyphenyl group, a 3-dodecyloxyphenyl group, a 4-dodecyloxyphenyl group, a 2-tetracocyloxyphenyl group, a 3-tetracocyloxyphenyl group, a 4-tetracocyloxyphenyl group, a 3,4-dimethoxyphenyl group, a 3,4-diethoxyphenyl group, a 3,4-dihexyloxyphenyl group, a 2,4-dimethoxyphenyl group, a 2,4-diethoxyphenyl group, a 2,4-dihexyloxyphenyl group, a 3,5-dimethopxyphenyl group, a 3,5-dimethoxyphenyl group, a 3,5-dihexyloxyphenyl group, a 3,4,5-trimethoxyphenyl group, a 3,4,5-triethoxyphenyl group, a 3,4,5-trihexyloxyphenyl group, a 2,4,6-trimethoxyphenyl group, a 2,4,6-triethoxyphenyl group, a 2,4,6-trihexyloxyphenyl group, a 2-fluorophenyl group, a 3-fluorophenyl group, a 4-fluorophenyl group, a 2-chlorophenyl group, a 3-chlorophenyl group, a 4-chlorophenyl group, a 2-bromophenyl group, a 3-bromophenyl group, a 4-bromophenyl group, a 3,4-difluorophenyl group, a 3,4-dichlorophenyl group, a 3,4-dibromophenyl group, a 2,4-difluorophenyl group, a 2,4-dichlorophenyl group, a 2,4-dibromophenyl group, a 3,5-difluorophenyl group, a 3,5-dichlorophenyl group, a 3,5-dibromophenyl group, a 3,4,5-trifluorophenyl group, a 3,4,5-trichlorophenyl group, a 3,4,5-tribromophenyl group, a 2,4,6-trifluorophenyl group, a 2,4,6-trichlorophenyl group, a 2,4,6-tribromophenyl group, a pentafluorophenyl group, a pentachlorophenyl group, a pentabromophenyl group, a 2-iodophenyl group, a 3-iodophenyl group, a 4-iodophenyl group, a 2-formylphenyl group, a 3-formylphenyl group, a 4-formylphenyl group, a 2-benzoylphenyl group, a 3-benzoylphenyl group, a 4-benzoylphenyl group, a 2-carboxyphenyl group, a 4-carboxyphenyl group, an o-tolyl group, a m-tolyl group, a p-tolyl group, a 2-ethylphenyl group, a 3-ethylphenyl group, a 4-ethylphenyl group, a 2-(2-methoxyethoxy)phenyl group, a 3-(2-methoxyethoxy)phenyl group, a 4-(2-methoxyethoxy)phenyl group, a 2-ethoxycarbonylphenyl group, a 3-ethoxycarbonylphenyl group, a 4-ethoxycarbonylphenyl group, a 2-benzoyloxyphenyl group, a 3-benzoyloxyphenyl group, and a 4-benzoyloxyphenyl group.

Heterocyclic groups may have a substituent(s). The heterocyclic ring of the heterocyclic groups is preferably a 5- or 6-membered ring. The heterocyclic ring of the heterocyclic groups may be subjected to condensation with an aliphatic ring, an aromatic ring, or another heterocyclic ring. Examples of hetero atoms of the heterocyclic rings include B, N, O, S, Se, and Te. Examples of heterocyclic groups include a pyrrolidine ring, a morpholine ring, a 2-bora-1,3-dioxolan ring, and a 1,3-thiazolidine ring. Examples of unsaturated heterocyclic rings include an imidazole ring, a thiazole ring, a benzothiazole ring, a benzoxazole ring, a benzotriazole ring, a benzoselenazole ring, a pyridine ring, a pyrimidine ring and a quinoline ring. Examples of substituents of the heterocyclic groups are the same as the examples of substituents of the substituted aryl group.

The molecular weight of compounds having a triphenylene ring is preferably 300 to 2,000, while the boiling point is preferably at least 260° C. It is possible to determine the boiling point employing a commercially available measurement apparatus (for example, TG/DTA100, manufactured by Seiko Denshi Kogyo Co.). Shown below are specific examples of R, corresponding to General Formula (2), described below, of compounds in which substituents of $R_1$ through $R_6$ of aforesaid General Formula (1) comprise the six same triphenylene rings.

General Formula (2)

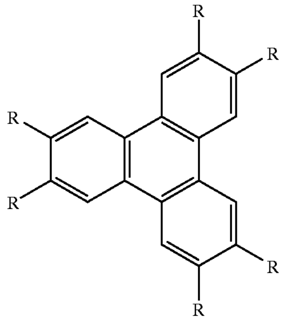

Listed as R may be (B-1) fluoro, (B-2) chloro, (B-3) bromo, (B-4) formyl, (B-5) benzoyl, (B-6) carboxyl, (B-7) butylamino, (B-8) benzylamino, (B-9) trimethylsilyloxy, (B-10) 1-pentynyl, (B-11) ethoxycarbonyl, (B-12) 2-hydroxyethoxycarbonyl, (B-13) phenoxycarbonyl, (B-14) N-phenylcarbamoyl, (B-15) N,N-diethylcarbamoyl, (B-16) 4-methoxybenzoyloxy, (B-17) N-phenylcarbamoyloxy, (B-18) hexyloxy, (B-19) 4-hexyloxybenzoyloxy, (B-20) ethoxy, (B-21) benzoyloxy, (B-22) m-dodecyloxyphenylthio, (B-23) t-octylthio, (B-24) p-fluorobenzoylthio, (B-25) isobutyrylthio, (B-26) p-methylbenzenesulfinyl, (B-27) ethansulfinyl, (B-28) benzenesulfonyl, (B-29) methanesulfonyl, (B-30) 2-methoxyethoxy, (B-31) propoxy, (B-32) 2-hydroxyethoxy, (B-33) 2-carboxyethoxy, (B-34) 3-heptenyloxy, (B-35) 2-phenylethoxy, (B-36) trichloromethoxy, (B-37) 2-propinyloxy, (B-38) 2,4-octadynylpoxy, (B-39) perfluoropentyloxy, (B-40) ethoxycarbonylmethoxy, (B-41) p-methoxyphenoxy, (B-42) m-ethoxyphenoxy, (B-43) o-chlorophenoxy, (B-44) m-dodecyloxyphenoxy, (B-45) 4-pyridyloxy, (B-46) pentafluorobenzoyloxy, (B-47) p-hexyloxybenzoyloxy, (B-48) 1-naphthoyloxy, (B-49) 2-naphthoyloxy, (B-50) 5-imidazolecarbonyloxy, (B-51)

o-phenoxycarbonylbenzoyloxy, (B-52) m-(2-methoxyethoxy)benzoyloxy, (B-53) o-carboxybenzoyloxy, (B-54) p-formylbenzoyloxy, (B-55) m-ethoxycarbonylbenzoyloxy, (B-56) p-pyvaroylbenzoyloxy, (B-57) propionyloxy, (B-58) phenylacetoxy, (B-59) cinnamoyloxy, (B-60) hydroxyacetoxy, (B-61) ethoxycarbonylacetoxy, (B-62) m-butoxyphenylpropioroyloxy, (B-63) propioroyloxy, (B-64) trimethylsilylpropioloyloxy, (B-65) 4-octenoyloxy, (B-66) 3-hydroxypropionyloxy, (B-67) 2-methoxyethoxyacetoxy, (B-68) perfluorobutylyloxy, (B-69) methanesulfonyloxy, (B-70) p-toluenesulfonyloxy, (B-71) triethylsilyl, (B-72) m-butoxyphenoxycarbonylamino, (B-73) hexyl, (B-74) phenyl, (B-75) 4-pyridyl, (B-76) benzyloxycarbonyloxy, (B-77) m-chlorobenzamide, and (B-78) 4-methylanilino.

Shown below are specific examples of R corresponding to General Formula (3), described below, of the compounds in which of substituents of $R_1$ through $R_6$ in aforesaid General Formula (1), five substituents are hydrogen atoms and the remaining substituent is the same triphenylene ring of R.

General Formula (3)

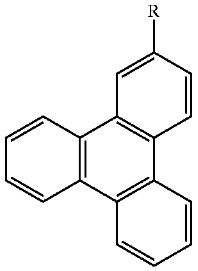

Listed as R may be (B-79) nitro, (B-80) sulfo, (B-81) formyl, (B-82) carboxyl, (B-83) methoxycarbonyl, (B-84) benzyloxycarbonyl, and (B-85) phenoxycarbonyl.

Shown below are specific examples of R corresponding to General Formula (4) of compounds in which $R_1$ of aforesaid General Formula (1) is a hydroxyl group and the five substitutes of $R_2$ through $R_6$ are the same triphenylene rings of R.

General Formula (4)

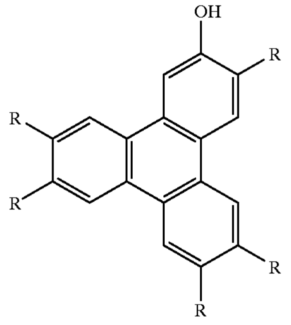

Listed as R may be (B-86) butoxy, (B-87) hexyloxy, (B-88) dodecyloxy, (B-89) hexanoyloxy, and (B-90) carboxymethoxy.

Further, listed as other examples of $R_1$ through $R_6$ of aforesaid General Formula (1) may be B-91 through B-100 described below.

B-91

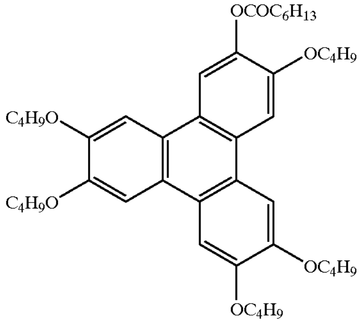

B-92

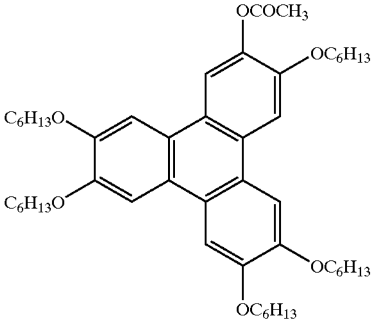

B-93

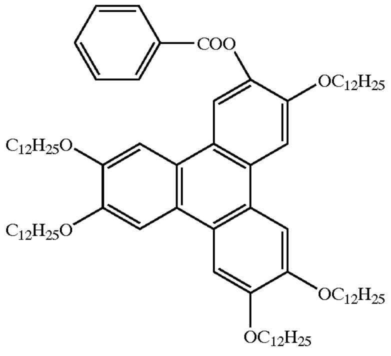

B-94

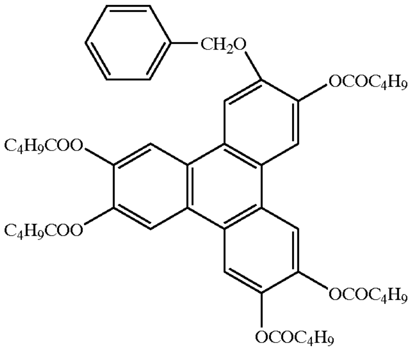

-continued
B-95
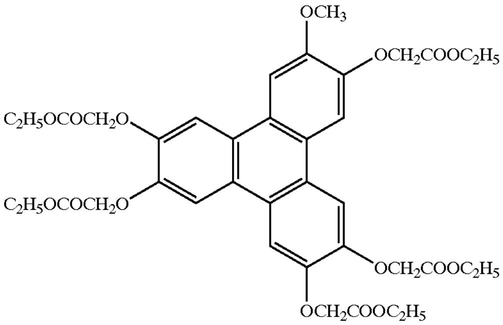
B-96
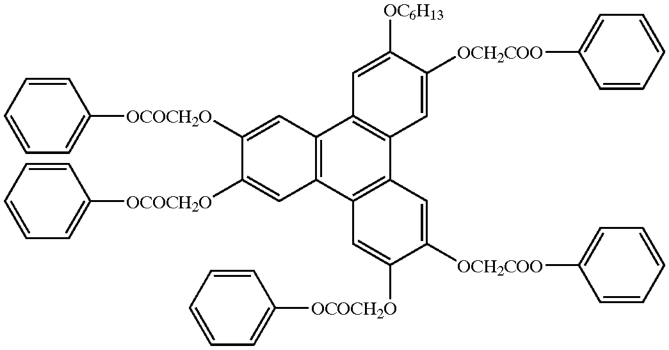
B-97
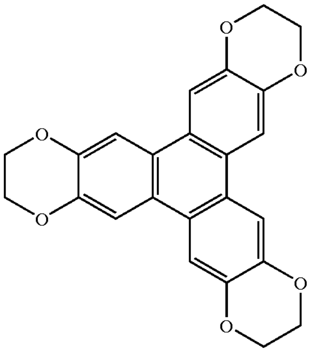
B-98
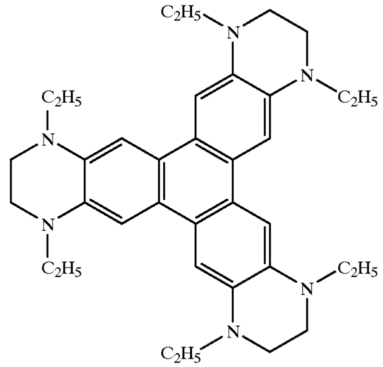
B-99
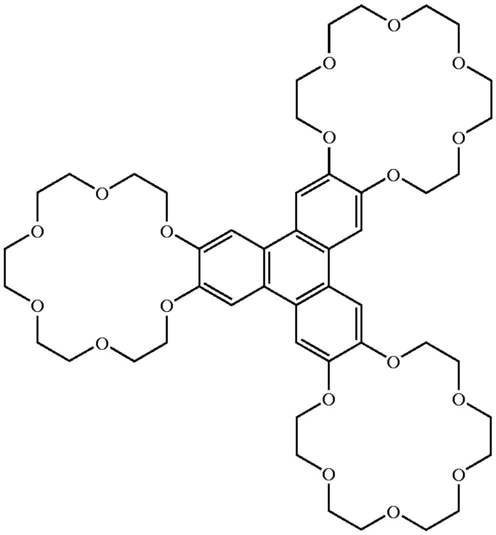
B-100
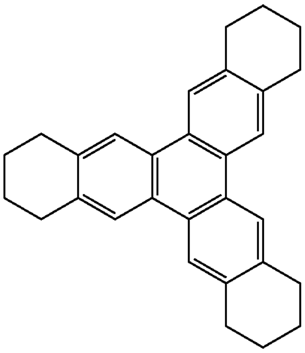

From the viewpoint of minimizing bleed-out, the added amount of compounds which have at least two aromatic rings and in which at least two aromatic rings exhibit a planar structure to a cellulose ester dope is preferably 0.4 to 10 percent by weight, and is more preferably 1.5 to 10 percent by weight. The proportion of the aforesaid compounds in the cellulose ester film is preferably 0.01 to 20 parts by weight with respect to 100 parts by weight of cellulose ester, is more preferably 5 to 30 parts by weight, and is most preferably 8 to 30 parts by weight.

In order to minimize degradation of the cellulose ester film, it is preferable that degradation inhibitors such as antioxidants or radical scavengers are incorporated into the aforesaid cellulose ester film.

Preferably employed as the aforesaid degradation inhibitors are hindered phenol based compounds, which include 2,6-di-t-butyl-p-cresol, pentaerythrityl-tetrakis[3-(3,5-di-t-butyl-4-hydroxyphenyl)propionate], triethylene glycol-bis [3-t-butyl-5-methyl-4-hydroxyphenyl]propionate], 1,6-hexanediol-bis[3-(3,5-di-t-butyl-4-hydroxyphenyl) propionate]2,4-bis-(n-octylthio)-6-(4-hydroxy-3,5-di-t-butylanilino)-1,3,5-triazine, 2,2-thio-diethylenebis[3-(3,5-di-t-butyl-4-hydroxyphenyl)propionate], octadecyl-3-(3,5-di-t-butyl-4-hydroxyphenyl)propionate, N,N'-hexamethylenebis(3,5-di-t-butyl-4-hydroxy-hydrocinnamide), 1,3,5-trimethyl-2,4,6-tris(3,5-di-t-butyl-4-hydroxybenzyl)benzene, and tris-(3,5-di-t-butyl-4-hydroxybenzyl)-isocyanurate. Of these, 2,6-di-t-butyl-p-cresol, pentaerythrityl-tetrakis[3-(3,5-di-t-butyl-4-hydroxyphenyl)propionate, and triethylene glycol-bis[3-(3-t-butyl-5-methyl-4-hydroxyphenyl)propionate are particularly preferred. Further, for example, hydrazine based metal deactivating agents such as N,N'-bis[3-(3,5-di-t-butyl-4-hydroxyphenyl)propionyl]hydrazine and phosphorous based process stabilizers such as tris(2,4-di-t-butylphenyl) phosphite may be simultaneously employed. The added amount of these compounds is preferably 1 ppm to 1.0 percent in terms of weight ratio and is more preferably 10 to 10,000 ppm.

In order to minimize degradation of cellulose ester film due to ultraviolet radiation, other than the aforesaid degradation minimizing agents, it is preferable that UV absorbers which function to eliminate or decrease ultraviolet radiation are incorporated. Preferred UV absorbers are those which efficiently absorb ultraviolet radiation having a wavelength of 370 nm or shorter, and from the viewpoint of visibility of liquid crystal display, absorb minimal visible light having a wavelength of 400 nm or longer. Examples include oxybenzophenone based compounds, benzotriazole based compounds, salicylic acid ester based compounds, benzophenone based compounds, cyanoacrylate based compounds, and nickel complex based compounds. Particularly preferred UV absorbers are benzotriazole based compounds and benzophenone based compounds. Of these, benzotriazole based compounds are preferred since they minimize unnecessary coloration of cellulose ester. For example, Tinuvin 109, Tinuvin 171, Tinuvin 326, Tinuvin 327, and Tinuvin 328, manufactured by Ciba Specialty Chemicals Co. may be preferably employed. However, depending on the used amount, low-molecular UV absorbers may deposit in the web or sublime during casting in the same manner as plasticizers. Consequently, the added amount is 0.01 to 5 percent by weight with respect to cellulose ester, and is preferably 0.13–3 percent by weight. Incidentally, these UV absorbers overlap the function of the compounds useful for the present invention, which have at least two aromatic rings and in which at least two aromatic rings exhibit a planar structure.

It is preferable that minute particles are incorporated into cellulose ester film. It is preferable to incorporate minute inorganic particles comprised of, for example, silicon dioxide, titanium dioxide, aluminum oxide, zirconium oxide, calcium carbonate, kaolin, talc, sintered calcium silicate, and calcium phosphate, and minute crosslinked polymer particles. Of these, silicon dioxide is preferred since it is possible to minimize the haze of film. The average secondary particles diameter of the aforesaid minute particles is customarily 0.01 to 1.0 μm. Their content is preferably 0.005 to 0.3 percent by weight with respect to the cellulose ester. Minute particles comprised of silicon dioxide are often subjected to a surface treatment employing organic substances. Such particles are preferred since it is possible to decrease the haze of film. Listed as organic substances which are preferable for the surface treatment are halosilanes, alkoxysilanes (specifically, alkoxysilanes having a methyl group), silazane, and siloxane. As the average diameter of minute particles increases, the resulting matting effect increases. On the contrary, as the average diameter decreases, transparency increases. Consequently, the average primary particle diameter of the minute particles is preferably 5 to 50 nm, and is more preferably 7 to 16 nm. These minute particles commonly exist in cellulose ester film in the form of aggregates. As a result, it is preferable that a roughness of 0.01 to 1.0 μm be formed on the surface of cellulose ester film. Listed as minute particles comprised of silicon dioxide may be Aerosil 200, 200V, 300, R972, R972V, R974, R202, R812, OX50, and TT600, manufactured by Aerosil Co. Of these, preferred are Aerosil 200V, R972, R972V, R974, R202, and R812. These minute particles may be employed in combinations of at least two types. When at least two types are employed in combination, they may be used while mixed at an optional ratio. In such a case, minute particles which differ in average particle diameter and material, for example, Aerosil 200V and R972 may be employed in the range of 0.1:99.9 to 99.9:0.1 in terms of weight ratio. In the present invention, during preparation of a dope, the minute particles may be mixed with cellulose ester, other additives, as well as organic solvents and then dispersed. However, it is preferable that being separated from the preparation of a cellulose ester solution, minute particles are sufficiently dispersed to form a dispersion and a dope is prepared. In order to disperse the aforesaid minute particles, it is preferable that minute particles are previously immersed in organic solvents and the resulting mixture finely dispersed employing a high shearing force homogenizer (such as a high pressure homogenizer). Thereafter, it is preferable that the resulting dispersion is dispersed in a large amount of organic solvents, and the resulting dispersion is allowed to join with a cellulose ester solution, and mixed by an in-line mixer to prepare a dope. In that case, UV absorbers may be added to the minute particle dispersion to form a liquid UV absorber composition.

The aforesaid degradation minimizing agents, UV absorbers and/or minute particles may be added together with cellulose ester and solvents during preparation of the cellulose ester solution, or they may be added during or after preparation of the solution.

Organic solvents which are useful for preparation of the dope according to the present invention may be employed without any limitations as long as they are capable of simultaneously dissolving cellulose ester, compounds which have at least two aromatic rings and in which at least two aromatic rings exhibit a planar structure. Listed as a chlorine based solvent may be, for example, methylene chloride, while listed as non-chlorine based solvents may be methyl acetate, ethyl acetate, amyl acetate, acetone, tetrahydrofuran, 1,3-dioxolan, 1,4-dioxane, cyclohexanone, ethyl formate, 2,2,2-trifluoroethanol, 2,2,3,3-hexafluoro-1-propanol, 1,3-difluoro-2-propanol, 1,1,1,3,3,3-hexafluoro-2-methyl-2-propanol, 1,1,1,3,3,3-hexafluoro-2-propanol, 2,2,3,3,3-pentafluoro-1-propanol, and nitroethane. Of these, preferably employed are methylene chloride, methyl acetate, ethyl acetate, and acetone, however methyl acetate is particularly preferred.

It is preferable that other than the aforesaid organic solvents, alcohols having 1 to 4 carbon atoms are incorporated into a dope in an amount of 1 to 40 percent by weight. When the alcohol ratio in the dope increases, the web becomes gel, resulting in ease of its peeling from a metal support. Further, when the alcohol ratio is low, dissolution of cellulose ester in a non-chlorine based organic solvent system is promoted. Listed as alcohols having 1 to 4 carbon atoms may be methanol, ethanol, n-propanol, iso-propanol, n-butanol, sec-butanol, and tert-butanol. Of these, ethanol is preferred due to dope stability, relatively low boiling point, desired drying property, and non-toxicity.

In order to achieve the desired surface quality of film, the concentration of cellulose ester in a dope is preferably 15 to 40 percent by weight, and dope viscosity is preferably controlled between 100 to 500 poise (P).

Plasticizers may be added to the dope. Preferably employed as plasticizers may be phosphoric acid based plasticizers, phthalic acid ester based plasticizers, glycolate based plasticizers, and citric acid ester based plasticizers. Listed as phosphoric acid ester based plasticizers may be the aforesaid triphenyl phosphate (TPP), tricresyl phosphate, cresyl phenyl phosphate, octyl diphenyl phosphate, diphenyl biphenyl phosphate, trioctyl phosphate, and tributyl phosphate; listed as phthalic acid ester based plasticizers may be diethyl phthalate, dimethoxyethyl phthalate, dimethyl phthalate, dioctyl phthalate, dibutyl phthalate, di-2-ethyl hexyl phthalate, butyl benzyl phthalate, di-2-ethylhexyl phthalate, butyl benzyl phthalate, and dibenzyl phthalate; listed as citric acid esters may be acetyl trimethyl citrate, and acetyl tributyl citrate; listed as glycolate based plasticizers may be alkyl phthalyl alkyl glycolate; and listed as others may be butyl oleate, methyl acetyl ricinolate, dibutyl sebacate, and triacetin. In the present invention, glycolate based plasticizers may be preferably employed and it is possible to list alkyl phthalyl alkyl glycolates in which the alkyl group has 1 to 8 carbon atoms. Listed as preferred glycolate based plasticizers may be methyl phthalyl methyl glycolate, ethyl phthalyl ethyl glycolate (EPEG), propyl phthalyl propyl glycolate, butyl phthalyl butyl glycolate, octyl phthalyl octyl glycolate, methyl phthalyl ethyl glycolate, ethyl phthalyl methyl glycolate, ethyl phthalyl propyl glycolate, propyl phthalyl ethyl glycolate, methyl phthalyl propyl glycolate, methyl phthalyl butyl glycolate, ethyl phthalyl butyl glycolate, butyl phthalyl methyl glycolate, butyl phthalyl ethyl glycolate, propyl phthalyl butyl glycolate, butyl phthalyl propyl glycolate, methyl phthalyl octyl glycolate, ethyl phthalyl octyl glycolate, octyl phthalyl methyl glycolate, and octyl phthalyl ethyl glycolate. Of these, preferred are methyl phthalyl methyl glycolate, ethyl phthalyl ethyl glycolate, propyl phthalyl propyl glycolate, butyl phthalyl butyl glycolate, and octyl phthalyl octyl glycolate. Of these, ethyl phthalyl ethyl glycolate is most preferably employed. Further, at least two types of these alkyl phthalyl alkyl glycolates may be mixed and employed.

From the viewpoint of increasing a close contact force and minimizing bleeding-out from the film, the added amount of alkyl phthalyl alkyl glycolates is preferably 1 to 10 percent by weight with respect to the cellulose ester. Plasticizers other than those described above may be mixed with alkyl phthalyl alkyl glycolates.

(Optically Anisotropic Layer)

It is possible to form an optically anisotropic layer by applying a liquid crystal composition (a liquid coating composition) comprising rod-like liquid crystal compounds, the polymerization initiators described below, and optional additives (for example, plasticizers, monomers, surface active agents, cellulose ester, 1,3,5-triazine compounds, and chiral agents) onto an orientation layer, and subsequently fixing the orientation of the aforesaid liquid crystal compounds.

Preferably employed as rod-like liquid crystal compounds in accordance with the present invention are azomethines, azoxys, cyanobiphenyls, cyanophenyl esters, benzoic acid esters, cyclohexanecarboxylic acid phenyl esters, cyanophenylcyclohexanes, cyano-substituted phenylpyrimidines, alkoxy-substituted phenylpyrimidines, phenyldioxanes, tolans, and alkenylcyclohexylbenzonitriles. Incidentally, metal complexes are included in the rod-like liquid crystal compounds. Further, employed as a rod-like liquid crystal compound may be liquid crystal polymers comprising rod-like liquid crystal compounds in repeating units. In other words, rod-like liquid crystal compounds may be joined to (liquid crystal) polymers. Rod-like liquid crystal compounds are described in Chapters 4, 7, and 11 of Kikan Kagaku Sosetsu (Quarterly Chemical Review) Volume 22 Ekisho no Kagaku (Chemistry of Liquid Crystals) (1994), edited by Nihon Kagaku Kai, as well as in Chapter 3 of Ekisho Device Handbook (Handbook of Liquid Crystal Devices), edited by Nihon Gakujutsu Shinko Kai No. 142 Iinkai. The birefringence of rod-like liquid crystal compounds is preferably in the range of 0.001 to 0.7. It is preferable that rod-like liquid crystal compounds have polymerizable group(s) in order to fix the resulting orientation state. Examples of polymerizable groups (Q) are shown below.

$-CH=CH_2$ (Q1)

$-CH=CH-CH_3$ (Q2)

$-CH=CH-C_2H_5$ (Q3)

$-CH=CH-C_3H_7(n)$ (Q4)

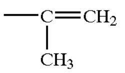 (Q5)

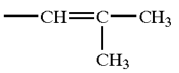 (Q6)

$-C\equiv CH$ (Q7)

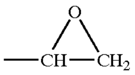 (Q8)

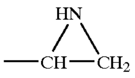 (Q9)

$-SH$ (Q10)

$-CHO$ (Q11)

-continued

—OH (Q12)

—$CO_2H$ (Q13)

—N=C=O (Q14)

—$NH_2$ (Q15)

—$SO_3H$ (Q16)

—N=C=S (Q17)

Polymerizable groups (Q) are preferably polymerizable unsaturated groups (Q1–Q7), an epoxy group (Q8), or an aziridinyl group (Q9), and are more preferably polymerizable unsaturated groups, are most preferably polymerizable ethylenic unsaturated groups (Q1 to Q6). It is preferable that rod-like liquid crystal compounds have a molecular structure in which symmetry is held with respect to the short axis direction. In order to achieve such a structure, it is preferable that polymerizable groups are positioned at both ends of the rod-like structure. Examples of rod-like liquid crystal compounds are shown below.

(N1)
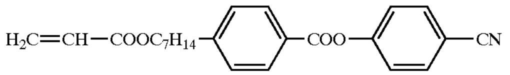

(N2)
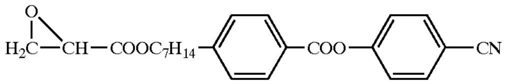

(N3)
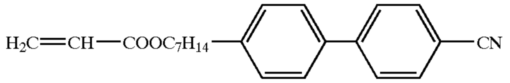

(N4)
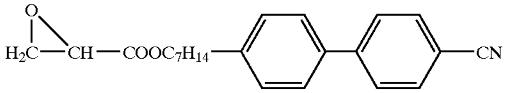

(N5)
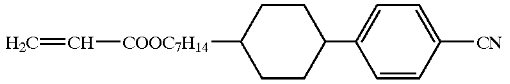

(N6)
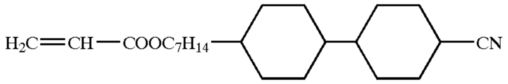

(N7)
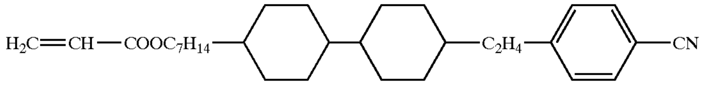

(N8)
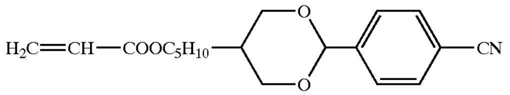

(N9)
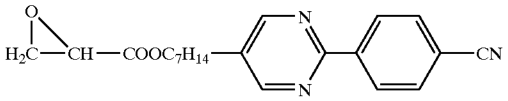

(N10)
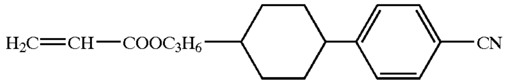

(N11)
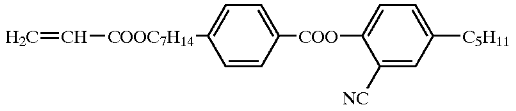

(N12)
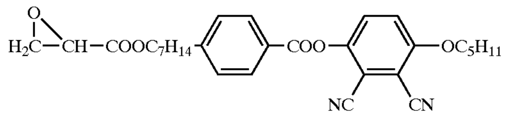

(N13)
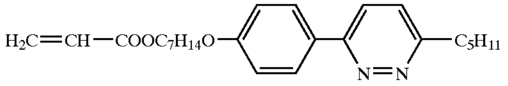

(N14)
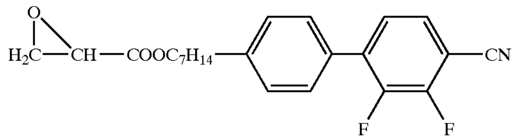

(N15)
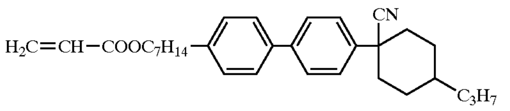

(N16)
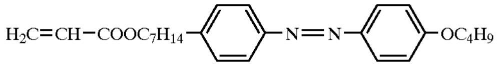

(N17)
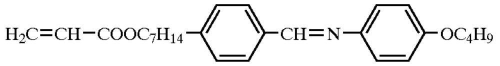

(N18)
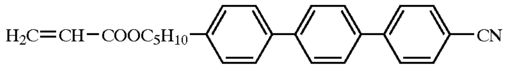

(N19)
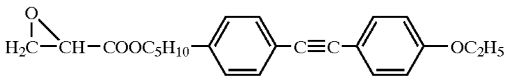

(N20)
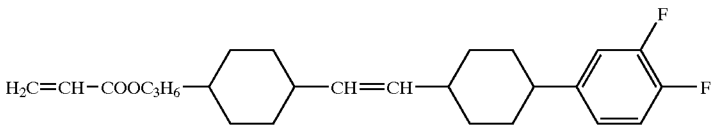

-continued
(N21)
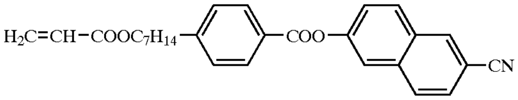
(N22)
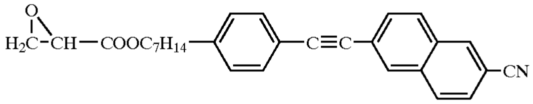
(N23)
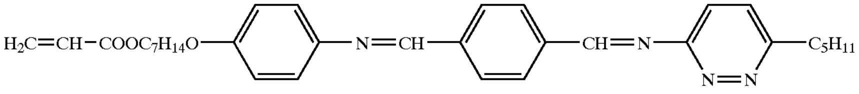
(N24)
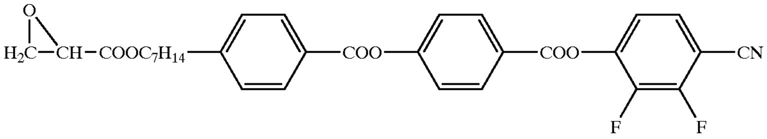
(N25)
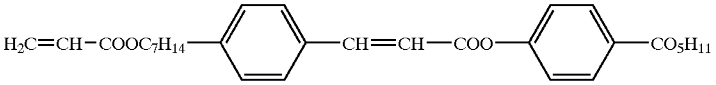
(N26)
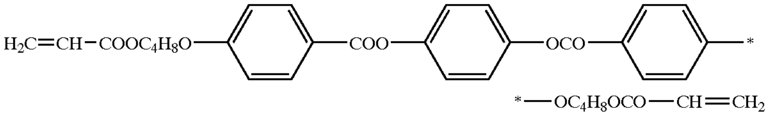
(N27)
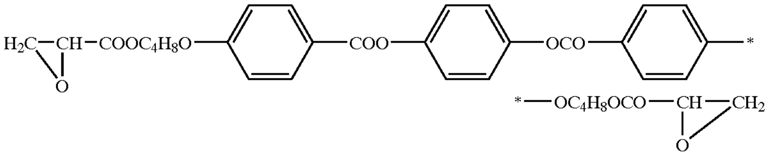
(N28)
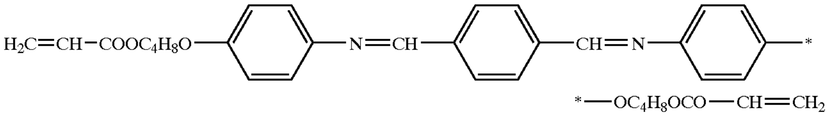
(N29)
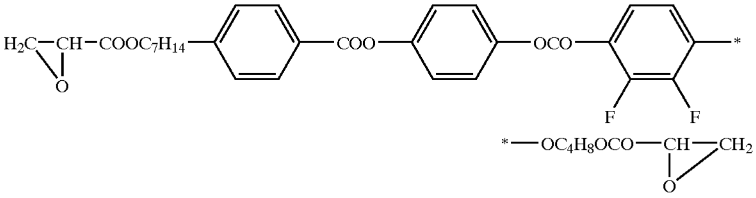
(N30)
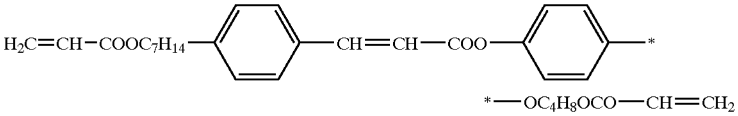
(N31)
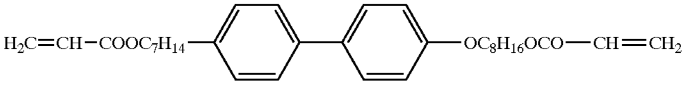
(N32)
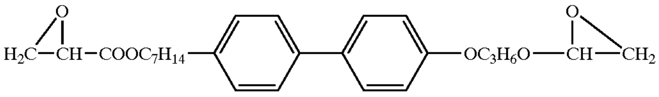
(N33)
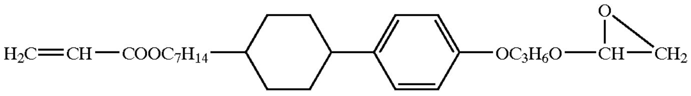

-continued
(N34)
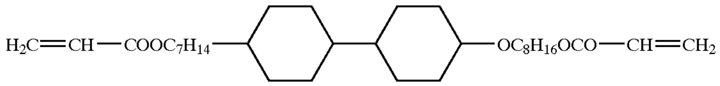
(N35)
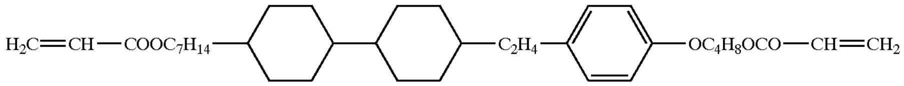
(N36)
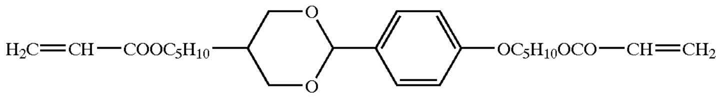
(N37)
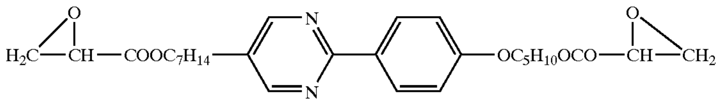
(N38)
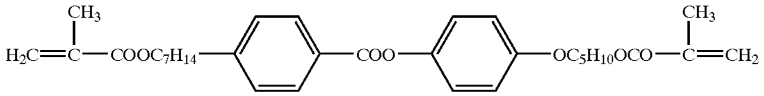
(N39)
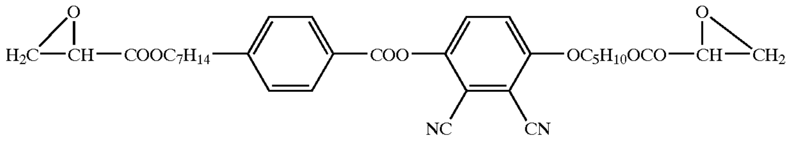
(N40)
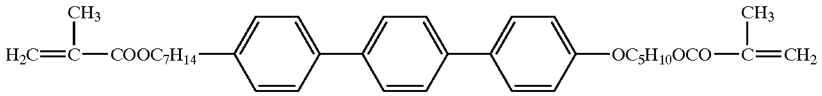
(N41)
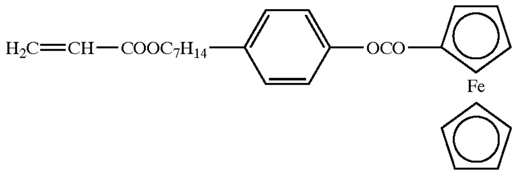
(N42)
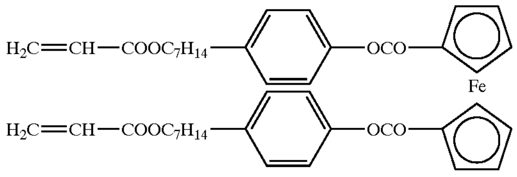
(N43)
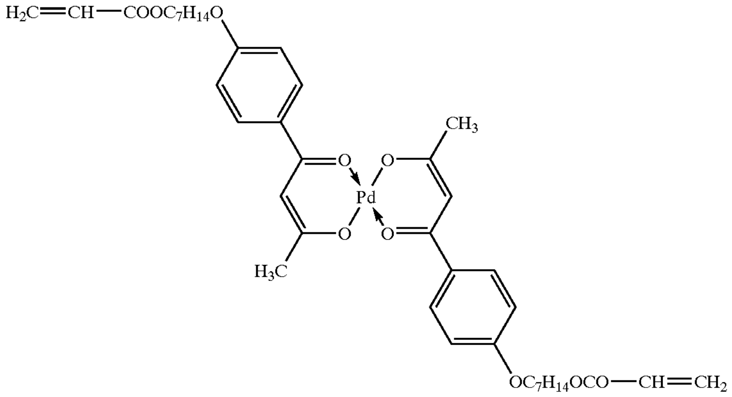

-continued
(N44)
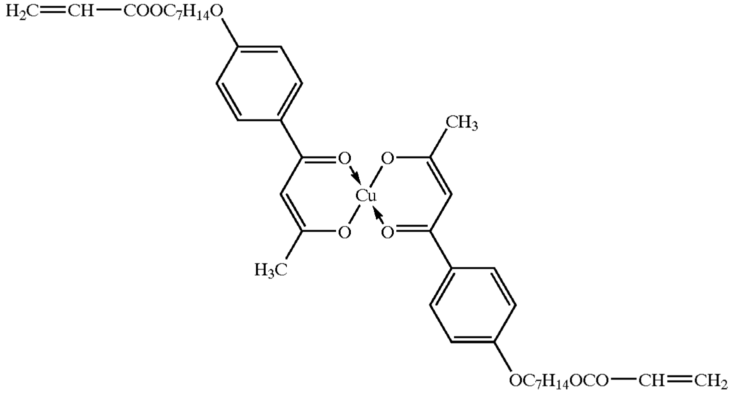
(N45)
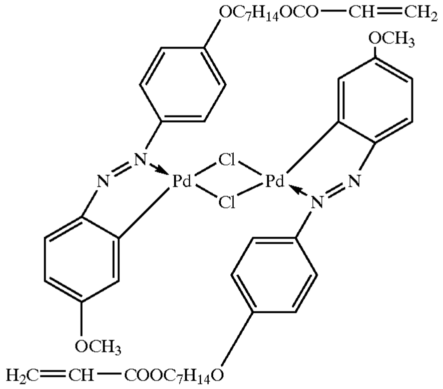
(N46)
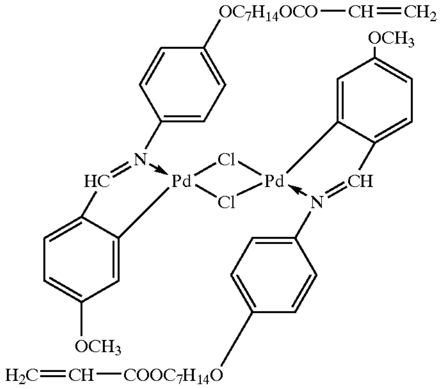
(N47)
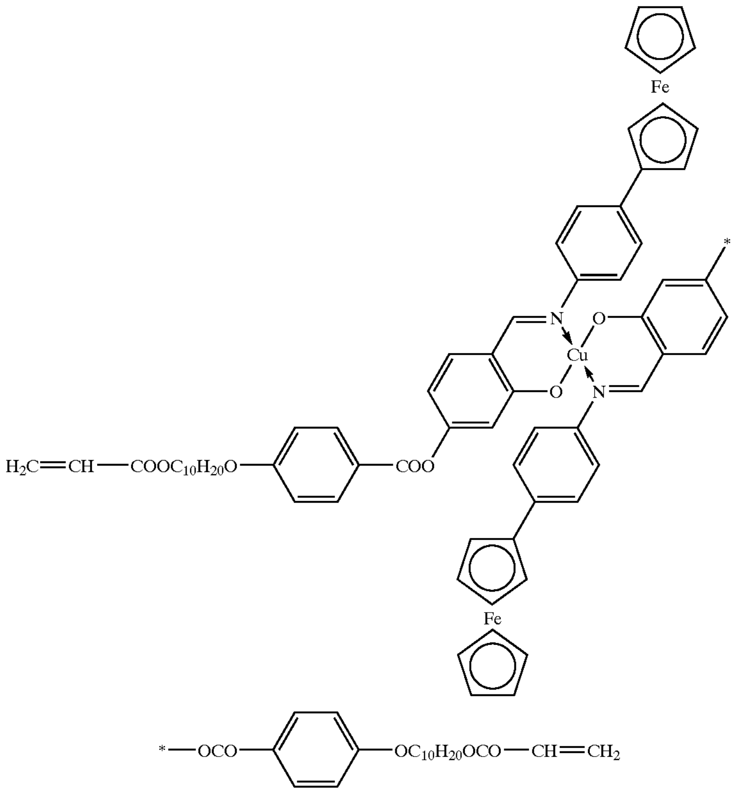

On the other hand, listed as examples of the use of discotic liquid crystal compounds may be benzene derivatives described in the research report of C. Destrade et al., Mol. Cryst., Volume 71, page 111 (1981), truxene derivatives described in the research reports of C. Destrade et al., Mol. Cryst., Volume 122, page 141 (1985) and Physics Lett, A, Volume 78, page 82 (1990), cyclohexane derivatives described in the research report of B. Kohne et al., Angew. Chem., Volume 96, page 70 (1984); and azacrown based and phenylacetylene based macrocycles in the research reports of M. Lehn et al., J. Chem. Commun., page 1794 (1985) and J. Zhang et al., J. Am. Chem. Soc., Volume 116, page 2655 (1994). Further, discotic liquid crystal compounds include those having a structure in which the aforesaid compounds are generally used as a mother nucleus at the center of the molecule and straight chain alkyl groups and alkoxy groups, and substituted benzoyloxy groups are radiately substituted while forming a straight chain, and the resulting compounds exhibit liquid crystal properties. However, discotic liquid crystal compounds are not limited to these as long as molecules exhibit negative uniaxial property and definite orientation can be provided. Further, in the present invention, in an optically anisotropic layer formed employing discotic liquid crystal compounds, finally formed ones need not to be the aforesaid compounds. For example, those which have lost crystal properties are included in which low molecular discotic liquid crystal compounds having a group (s) which undergoes reaction under an application of heat or light, result in polymerization or crosslinking via thermal or photolytic reaction. Preferable examples of discotic liquid crystal compounds are described in Japanese Patent Publication Open to Public Inspection No. 8-5020. Further, polymerization of discotic liquid crystal compounds is described in Japanese Patent Publication Open to Public Inspection No. 8-27284.

In order to securely fix the discotic liquid crystal compounds by polymerization, it is required that a polymerizable group(s) be joined to the discotic core of discotic liquid crystal compounds as a substituent. However, when the polymerizable group is directly joined to the discotic core, it becomes difficult to maintain the desired orientation state during polymerization reaction. Consequently, a linking group is introduced between the discotic core and the polymerizable group. Therefore, discotic liquid crystal compounds having a polymerizable group(s) are preferably those represented by General Formula (5), described below.

$D(\text{-L-P})_n$ General Formula (5)

In General Formula (5), D represents a discotic core, L represents a divalent linking group, P represents a polymerizable group, while n represents an integer of 4 to 12. Examples of the discotic core (D) are shown below. In each of the following examples, LP (or PL) refers to the combinations of the divalent linking group (L) and the polymerizable group (P).

(D1)

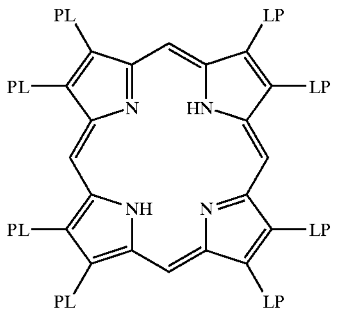

(D2)

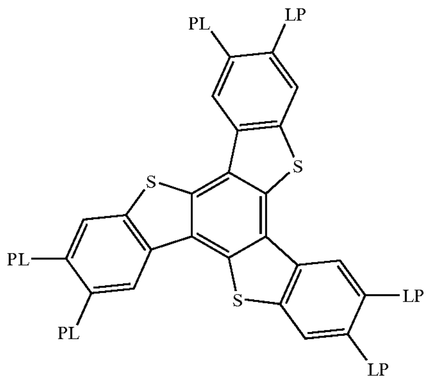

(D3)

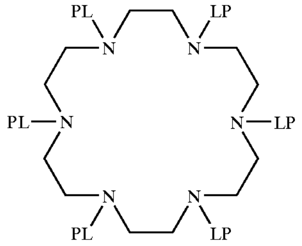

(D4)

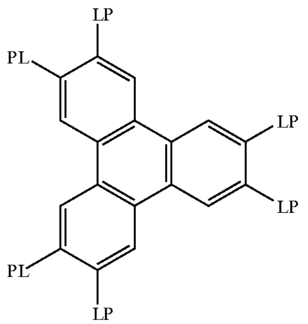

(D5)

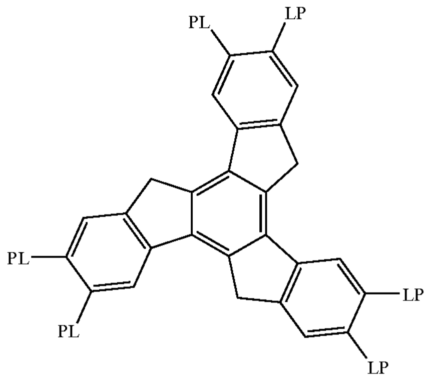

-continued
(D6)
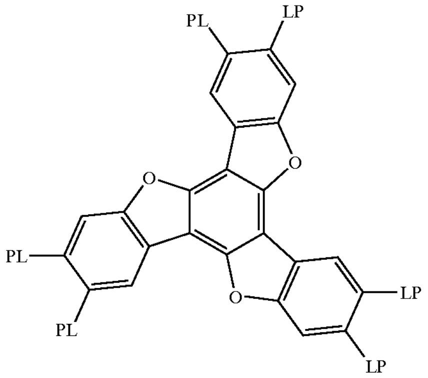
(D7)
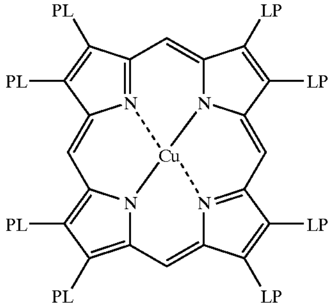
(D8)
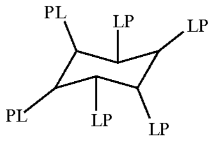
(D9)
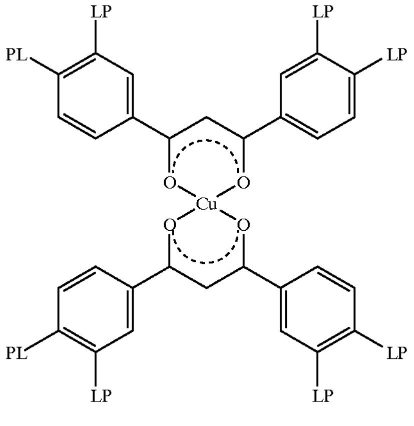
(D10)
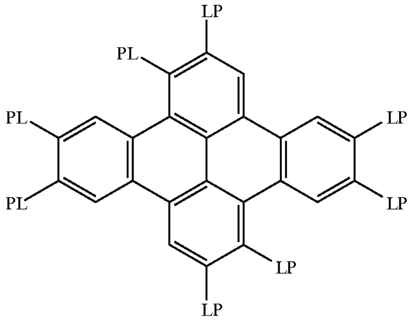
-continued
(D11)
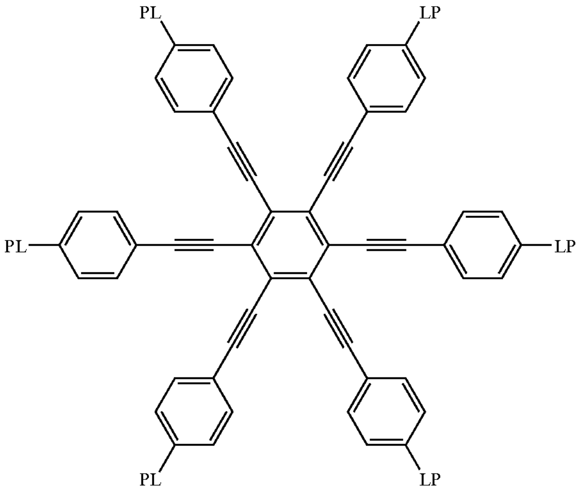
(D12)
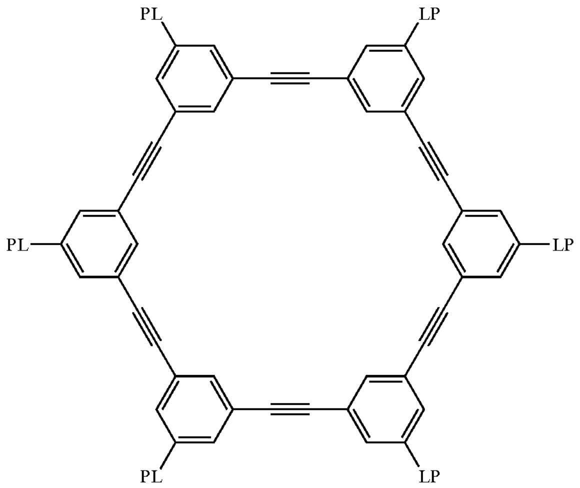
(D13)
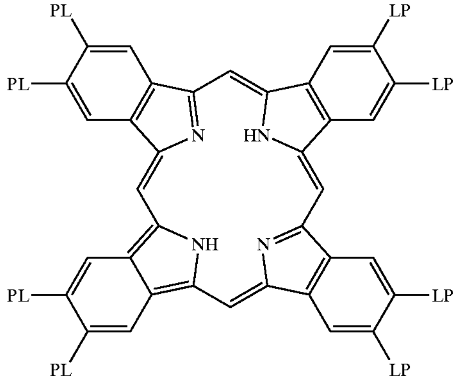

-continued (D14)

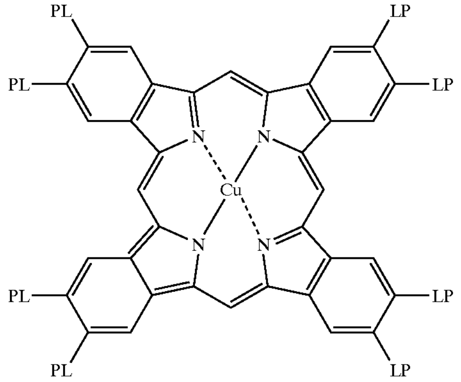

(D15)

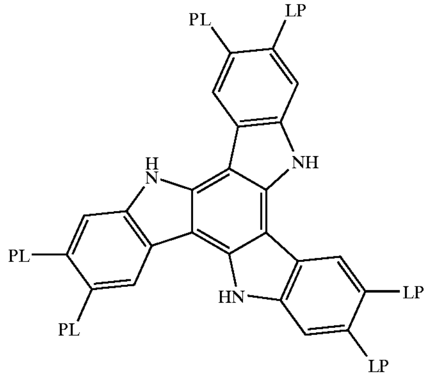

In General Formula (5), the divalent linking group (L) is preferably an alkylene group, an alkenylene group, an arylene group, —C—, —NH—, —O—, and —S—, and a divalent linking group selected from the group consisting of combinations thereof. Divalent linking group (L) is more preferably a divalent linking group prepared by combining at least two divalent-groups selected from the group consisting of an alkylene group, an arylene group, —CO—, —NH—, —O—, and —S—. Divalent linking group (L) is most preferably a divalent linking group which is formed by combining at least two divalent groups selected from the group consisting of —CO— and —O—. The number of carbon atoms of the alkylene group is preferably 1 to 12. The number of carbon atoms of the alkenylene group is preferably 2 to 12. The number of carbon atoms of the arylene group is preferably 6 to 10.

Examples of divalent linking groups (L) are shown below. The left side is joined to the discotic core (D), while the right side is joined to the polymerizable group (P). AL represents an alkylene group or an alkenylene group, while AR represents an arylene group. Incidentally, the alkylene group, alkenylene group and arylene group may have a substituent (e.g. an alkyl group).

L1: -AL-CO—O-AL-
L2: -AL-CO—O-AL-O—
L3: -AL-CO—O-AL-O-AL-
L4: -AL-CO—O-AL-O—CO—
L5: —CO-AR-O-AL-
L6: —CO-AR-O-AL-O—
L7: —CO-AR-O-AL-O—CO—
L8: —CO—NH—Al—
L9: —NH-AL-C—
L10: —NH-AL-O—CO—
L11: —O-AL-
L12: —O-AL-C—
L13: —O-AL-O—CO—
L14: —O-AL-O—CO—NH-AL-
L15: —O-AL-S-AL-
L16: —O—CO-AR—O-AL-CO—
L17: —O—CO-AR—O-AL-O—CO—
L18: —O—CO-AR—O-AL-O-AL-O—CO—
L19: —O—CO-AR—O-AL-O-AL-O-AL-O—CO—
L20: —S-AL-
L21: —S-AL-O—
L22: —S-AL-C—CO—
L23: —S-AL-S—Al—
L24: —S-AR-AL-

Polymerizable group (P) of General Formula (5) is determined based on the type of polymerization reaction. Examples of polymerizable groups (P) are shown below.

$—CH{=}CH_2$ (P1)

$—C{\equiv}CH$ (P2)

$—CH_2—C{\equiv}CH$ (P3)

$—NH_2$ (P4)

$—SO_3H$ (P5)

(P6)

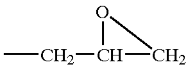

(P7)

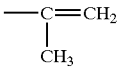

$—CH{=}CH—CH_3$ (P8)

$—N{=}C{=}S$ (P9)

$—SH$ (P10)

$—CHO$ (P11)

$—OH$ (P12)

$—CO_2H$ (P13)

$—N{=}C{=}O$ (P14)

$—CH{=}CH—C_2H_5$ (P15)

$—CH{=}CH—C_3H_7(n)$ (P16)

(P17)

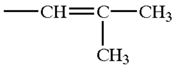

(P18)

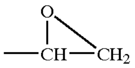

The polymerizable group (P) is preferably a polymerizable unsaturated group (P1, P2, P3, P7, P8, P15, P16 or P17) or an epoxy group (P6 or P18), is more preferably a polymerizable unsaturated group, and is most preferably a polymerizable ethylenic unsaturated group (P1, P7, P8, P16, or P17). In General Formula (5), n is an integer of 4 to 12. The specific figure is determined based on the type of the discotic core (D). When a plurality of L and P is combined, they may be different or the same.

When discotic liquid crystal compounds are employed, it is preferable that the optically anisotropic layer exhibits negative birefringence, the plane of discotic structure units is inclined to the plane of the cellulose ester film, and the angle between the plane of the discotic structure units and the surface of the cellulose ester film varies in depth of the optically anisotropic layer.

The angle of the plane of discotic structure units (the inclination angle) generally increases or decreases in depth of the optically anisotropic layer as the distance from the bottom surface of the optically anisotropic layer increases. It is preferable that the inclination angle increases as the distance increases. Further, listed as the variation of the inclination angle may be a continuous increase, a continuous decrease, an intermittent increase, an intermittent decrease, variation including a continuous increase and a continuous decrease, and intermittent variation including an increase and a decrease. The intermittent variation includes the range in which the inclination angle does not vary on the way of the depth. The inclination angle, even though including the range of no variation of the inclination angle, is totally increased or decreased. Further, it is preferable that the inclination angle is totally increased and particularly varies continuously.

It is generally possible to regulate the inclination angle of discotic units on the support side by selecting discotic liquid crystal compounds or materials of the orientation layer, or selecting rubbing methods. Further, it is generally possible to regulate the inclination angle of discotic units on the surface side (the ambient air side) by selecting discotic liquid crystal compounds or other compounds used with the discotic liquid crystal compounds. Listed as examples of compounds usable with discotic liquid crystal compounds may be plasticizers, surface active agents, as well as polymerizable monomers and polymers. It is possible to regulate the degree of variation of the inclination angle, employing the same selection parameters as above.

Employed as plasticizers, surface active agents, and polymerizable monomers may be any appropriate compounds as long as they exhibit compatibility with discotic liquid crystal compounds, and enable variation of the inclination angle of discotic liquid crystal compounds or do not hinder their orientation. Of these, preferred are polymerizable monomers (for example, compounds having a vinyl group, a vinyloxy group, an acryloyl group, and a methacryloyl group). The added amount of the aforesaid compounds is customarily 1-50 percent by weight with respect to the discotic compounds, and is preferably 5 to 30 percent by weight.

Employed as polymers which are used together with discotic liquid crystal compounds may be any polymers as long as they exhibit compatibility with discotic liquid crystal compounds and enable variation of the inclination angle of discotic liquid crystal compounds. Listed as an example of the polymer may be cellulose ester. Listed as preferable examples of cellulose ester may be cellulose acetate, cellulose acetate propionate, hydroxypropyl cellulose, and cellulose acetate butyrate. The added amount of the aforesaid polymers is customarily 0.1 to 10 percent by weight with respect to the discotic liquid crystal compounds so that they do not hinder the orientation of the discotic liquid crystal compounds, is more preferably 0.1 to 8 percent by weight, and is still more preferably 0.1 to 5 percent by weight.

An optically anisotropic layer is prepared in such a manner that a solution prepared by dissolving discotic liquid crystal compounds and other compounds in solvents is applied onto an orientation layer, dried, subsequently heated to a discotic nematic phase forming temperature, and then cooled while maintaining an orientation state (a discotic nematic phase). Alternatively, the aforesaid optically anisotropic layer is prepared in such a manner that a solution, prepared by dissolving discotic liquid crystal compounds and other compounds (for example, polymerizable monomers and photopolymerization initiators) in solvents, is applied onto an orientation layer, dried, subsequently heated to a discotic nematic phase forming temperature followed by polymerization by exposure to ultraviolet radiation, and further cooled. The discotic nematic liquid crystal phase-solid phase transition temperature range is preferably 70 to 300° C., and is most preferably 70 to 170° C.

EXAMPLES

The embodiments and effects of the present invention will now be described.

Initially, all the measurement methods of various physical properties will be described below.

(Measurement of Degree of Substitution and Degree of Acetylation of Cellulose Ester Film)

Degree of acetyl substitution (DSa) and degree of propionyl substitution (DSp) were determined in accordance with ASTM-D817-96. Degree of substitution (DSa), as described herein, refers to the value represented by a glucopyranose unit which relates to the number of OH groups in a cellulose ester molecule, which is or are substituted while reacting with acetic acid. Consequently, DSa ranges from 0 to 3.

Further, the degree of acetylation refers to the percent by weight of acetic acid in cellulose acetate and is calculated based on the formula described below.

Degree of acetylation={DSa×(molecular weight of $CH_3COOH$)}/{(molecular weight of ($C_6H_{10}O_5$)+DSa×(molecular weight of $CH_2CO$)+DSp×(molecular weight of $CH_3CHCO$)}($R_0$, $R_t$, Delayed-Phase Axis Direction)

The average refractive index of samples was determined employing an Abbe's refractometer. Further, the birefringence index was determined at a wavelength of 590 nm under an ambience of 23° C. and 55 percent relative humidity, employing an automatic birefringence analyzer KOBRA-21ADH (manufactured by Oji Scientific Instruments). Subsequently, refractive indices $N_x$, $N_y$, and $N_z$ were obtained through calculation utilizing the determined values of the phase difference and average refractive indices. Simultaneously, the delayed-phase axis direction was also determined.

(Measurement of Photoelastic Coefficients C(md) and C(td))

After casting and drying, retardation (R) within a film plane was determined while applying a load to the film, and subsequently, $\Delta n$ (=R/d) was obtained by dividing the resulting retardation by film thickness (d). While varying the applied load, $\Delta n$ was determined and a weight–$\Delta n$ curve was prepared. The resulting gradient was designated as a photoelastic coefficient. Retardation (R) within the film plane was determined at a wavelength of 589 nm, under an ambience of 23° C. and 55 percent relative humidity, employing a retardation measurement apparatus (KOBURA31PR, manufactured by Oji Scientific Instruments). A load was applied in the md and td directions of the film and the resulting photoelastic coefficients were designated as C(md) $Pa^{-1}$ and C(td) $Pa^{-1}$, respectively.

(Dimensional Variation Ratio)

Parallel lines at a spacing of about 10 cm were marked on a film employing a cutter, and the film was allowed to stand for 24 hours at 23° C. and 50 percent relative humidity. The resulting spacing was then measured. Thereafter, the film was stored for 50 hours at 80° C. and 90 percent relative humidity, followed by storing the film for at least 24 hours at 23° C. and 50 percent relative humidity, and the resulting distance was again measured.

Dimensional variation ratios S(md) and S(td) in the md and td directions were determined based on spacing variation prior to and after storage.

(Viewing Angle Characteristics and Durability)

In order to evaluate viewing angle characteristics, the amount of transmitted light was determined on a black display as well as on a white display, employing an EZ-Contrast, manufactured by ELDIM Ltd. Viewing angle characteristic were evaluated while calculating contrast=(the amount of transmitted light on a white display)/the amount of transmitted light on a black display).

In order to evaluate the durability of viewing angle functions, viewing angle characteristics were determined prior to after storage at 60° C. and 90 percent relative humidity for 500 hours, and the variation of the angle showing a viewing angle of contrast 10 was observed.

Evaluation

A: no viewing angle variation neither in the mechanical direction nor in the transverse direction B: the viewing angle varied 2 to 5 degrees either in the mechanical direction or in the transverse direction C: the viewing angle varied 2 to 5 degrees either in the mechanical direction or in the transverse direction In this case, evaluations A and B are commercially viable.

Example 1

(Preparation of Dope A)

One part by weight of Aerosil R972 and 9 parts by weight of ethanol were blended in a vessel, and the resulting mixture was finely dispersed employing a Manton-Gaulin homogenizer with a shearing force of 30 MPa to prepare a minute particle stock composition. Subsequently, the resulting stock composition was diluted by 9 parts by weight of methylene chloride in a pressure proof sealed vessel, and the resulting mixture was designated as a filler dispersion diluted liquid composition.

Dissolved in 14.2 parts by weight of methylene chloride were 1.2 parts by weight of a UV absorber and 0.7 part by weight of cellulose ester (described in A of Table 1), and 3.0 parts by weight of the aforesaid filler dispersion diluted liquid composition was added while stirring. The resulting mixture was designated as a filler addition liquid composition. The cellulose ester solution composition described below was introduced into another pressure proof sealed vessel, whereby a cellulose ester solution was prepared employing a high temperature dissolution method. During that time, pressure in the pressure proof sealed vessel was maintained at 0.2 MPa and dissolution was carried out while stirring. Subsequently, 0.04 part by weight of the aforesaid filler addition liquid composition was poured into 1.0 part by weight of a cellulose ester solution and after being well stirred, the resulting mixture was allowed to stand overnight. Thereafter, the resulting solution was filtered employing an Azumi Filter Paper No. 244, manufactured by Azumi Filter Paper Co., whereby Dope A was prepared.

TABLE 1

| Cellulose Ester | X | Y | X + Y | Degree of Acetylation |
|---|---|---|---|---|
| A | 1.9 | 0.75 | 2.65 | 40% |
| B | 2.8 | 0 | 2.8 | 60% |

(Cellulose Ester Solution Composition)

| | |
|---|---|
| Cellulose ester (described in A of Table 1) | 100 weight parts |
| TPP | 8.5 weight parts |
| EPEG | 2 weight parts |
| Methylene chloride | 300 weight parts |
| Ethanol | 57 weight parts |

(Preparation of Dope B)

Dope B was prepared in the same manner as Dope A, except that cellulose ester (described in A of Table 1) was replaced with Cellulose Ester B at a degree of acetylation of 60 percent and 6 parts by weight of the aforesaid Exemplified Compound A-7 were added to 100 parts by weight of cellulose ester.

(Preparation of Dope C)

Dope C was prepared in the same manner as Dope B, except that Compound A-7 was omitted.

(Preparation of Optical Compensation Cellulose Ester Film)

Aforesaid Dope A, maintained at 35° C., was extruded from a die onto a stainless steel support belt maintained at 35° C. The drying air temperature onto the support was maintained at 40° C. Thereafter, the support temperature was lowered to 20° C., and the resulting web was peeled from the support at a residual solvent amount of 80 percent by weight. Subsequently, while both edges of the web were maintained employing a tenter, orientation was carried out under conditions of an orientation factor of 1.3, a web temperature of 80° C. during orientation, and a residual web solvent ratio of 20 percent during orientation. The resulting web was dried employing 500 rollers at a conveying tension of 100 N and a drying temperature of 100° C., while performing relaxation in the transverse direction, whereby Optical Compensation Cellulose Ester Film D was prepared in the form of a wound roll.

(Preparation of Viewing Angle Compensation Integral Type Polarizing Plate (Optical Compensation Polarizing Plate))

Rolled Optical Compensation Cellulose Ester Film D was treated at 60° C. in a 2 mol/l aqueous sodium hydroxide solution for 2 minutes. After water washing, the resulting film was dried at 100° C. for 10 minutes, whereby an alkali saponificated polarizing plate protective film was prepared.

On the other hand, a 120 μm thick polyvinyl alcohol film was immersed in 100 parts by weight of an aqueous solution comprising one part by weight of iodine and 4 parts by weight of boric acid, and the resulting film was oriented at 50° C. by a factor of 4, whereby a polarizer (a polarizing film) was prepared.

Polarizing plate protective film was adhered to both sides of the polarizer employing a 5 percent aqueous completely saponificated type polyvinyl alcohol solution as an adhesive. At this time, adhesion was carried out so that the transmission axis of the polarizer and the delayed-phase axis of the optical compensation cellulose ester film were parallel.

Further, rolled Optical Compensation Cellulose Ester Film F (a comparative example) was prepared in the same manner as rolled Optical Compensation Cellulose Ester Film D, except that the resulting film was dried without relaxing the film after orientation in the transverse direction.

The resulting film was adhered to the polarizer employing the same method as above and Viewing Angle Compensation Integral Type Polarizing Plate G (being a comparative example) was prepared.

Optical Compensation Cellulose Ester Film H, which had been subjected to relaxing while drying, was prepared in the same manner as rolled Optical Compensation Cellulose Ester Film D, except that Dope A was replaced with Dope B.

Rolled Optical Compensation Cellulose Ester Film I (a comparative example) was prepared in the same manner as rolled Optical Compensation Cellulose Ester Film F, except that Dope A was replaced with Dope B.

By employing the resulting Films H and I, Viewing Angle Compensation Integral Type Polarizing Plates M (present invention) and N (comparative example) were prepared and evaluated.

Further, by employing Dope C, prepared was Optical Compensation Cellulose Ester Film J which had been subjected to relaxation drying. By employing the resulting Film J, Viewing Angle Compensation Integral Type Polarizing Plate K (the present invention) was prepared and evaluated.

In Table 2 below, physical properties of viewing angle compensation ester films as well as the performance of optical compensation polarizing plates employing the same are summarized and shown.

Example 2

Alkyl-modified polyvinyl alcohol (0.1 $\mu$m) was applied onto one side of each of Viewing Angle Compensation Integral Type Polarizing Plates E and G and dried by 65° C. air flow. Thereafter, an orientation layer was prepared by carrying out a rubbing treatment parallel to the mechanical direction (the absorption axis direction of the polarizer) of the film.

Further, Solution LC-1 having the composition described below was applied onto the orientation layer. The resulting orientation was firmly fixed by exposure to 450 mL/cm$^3$ of ultraviolet radiation under the condition of an oxygen concentration of at least 0.1 percent. Subsequently, an optically anisotropic layer having a nematic hybrid structure was applied onto one side, whereby Viewing Angle Compensation Polarizing Plates L and O were prepared corresponding to each of Viewing Angle Compensation Integral Type Polarizing Plates E and G. The aforesaid treatments were carried out through roller conveyance.

TABLE 2

| Polarizing Plate | $R_0$ | $R_t$ | C(md) | C(td) | \|S(md)\| | \|S(td)\| | C(md) × \|S(md)\| | | C(td) × \|S(td)\| | Durability of Viewing Angle Function |
|---|---|---|---|---|---|---|---|---|---|---|
| E | 35 | 135 | $1.26 \times 10^{-11}$ | $1.40 \times 10^{-11}$ | 0.009 | 0.003 | $1.1 \times 10^{-13}$ | > | $4.2 \times 10^{-14}$ | A |
| G | 38 | 138 | $1.26 \times 10^{-11}$ | $1.38 \times 10^{-11}$ | 0.002 | 0.008 | $2.5 \times 10^{-14}$ | < | $1.1 \times 10^{-13}$ | C |
| M | 40 | 140 | $1.26 \times 10^{-11}$ | $1.31 \times 10^{-11}$ | 0.002 | 0.001 | $2.5 \times 10^{-14}$ | > | $1.3 \times 10^{-14}$ | A |
| N | 43 | 140 | $1.27 \times 10^{-11}$ | $1.30 \times 10^{-11}$ | 0.003 | 0.005 | $3.8 \times 10^{-14}$ | < | $6.5 \times 10^{-14}$ | C |
| K | 25 | 85 | $1.26 \times 10^{-11}$ | $1.38 \times 10^{-11}$ | 0.002 | 0.001 | $2.5 \times 10^{-14}$ | > | $1.4 \times 10^{-14}$ | A |

As noted above, the optical compensation film of Viewing Angle Compensation Integral Type Polarizing Plates E, M, and K within the present invention satisfy |S(md)|>|S(td)| and C(md)<C(td), and in the dimensional variation increasing direction, the photoelastic coefficient decreases, whereby the viewing angle is minimally affected. As a result, in the evaluation of viewing angle durability, it was possible to achieve ranking A.

However, in the optical compensation film of Viewing Angle Compensation Integral Type Polarizing Plates G and N, which were comparative examples, the photoelastic coefficient, in the dimensional variation increasing direction, increased resulting in variation of phase difference. As a result, it was no possible to achieve sufficient viewing angle durability.

Viewing Angle Compensation Integral Type Polarizing Plate K, employing cellulose ester, which did not comprise the compounds incorporating at least two aromatic rings, resulted in a high haze problem of the film.

The optically anisotropic layer was placed and adhered onto the glass surface side of the liquid crystal cell. Evaluation was then carried out in the same manner as Example 1. Viewing Angle Compensation Polarizing Plate L of the present invention resulted in a durability evaluation of A, while Comparative Viewing Angle Compensation Polarizing Plate resulted in an evaluation of C.

(LC-1 Composition)

| | |
|---|---|
| MEK (methyl ethyl ketone) | 88 weight parts |
| Compound 1 | 3 weight parts |
| Compound 2 | 3 weight parts |
| Compound 3 | 3 weight parts |
| Compound 4 | 2 weight parts |

Irugacure 369 (manufactured by Ciba Specialty Chemical Co.) 1 weight part

Compound 1

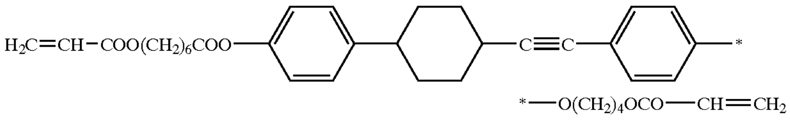

Compound 2

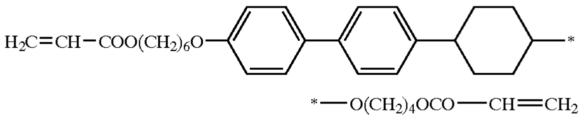

Compound 3

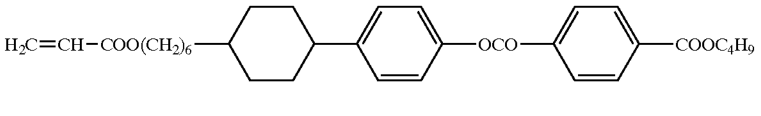

-continued

Compound 4

$H_2C{=}CH{-}COO(CH_2)_4OCO{-}CH{=}CH_2$

Example 3

Alkyl-modified polyvinyl alcohol (0.1 μm) was applied onto one side of each of Viewing Angle Compensation Integral Type Polarizing Plates E, G, M, and N and dried by 65° C. air flow. Thereafter, an orientation layer was prepared by carrying out a rubbing treatment parallel to the mechanical direction (the absorption axis direction of the polarizer) of the film.

Dissolved in 102 g of methyl ethyl ketone were 41.01 g of the discotic liquid crystal compound described below, 4.06 g of ethylene oxide-modified trimethylolpropane triacrylate (V#360, manufactured by Osaka Organic Chemical Industry Ltd.), 0.90 g of cellulose acetate butyrate (CAB551-0.2, manufactured by Eastman Chemical Co.), 0.23 g of cellulose acetate butyrate (CAB531-1, manufactured by Eastman Chemical Co.), 1.35 g of a photopolymerization initiator (Irugacure 907, manufactured by Ciba-Geigy Corp.), and 0.45 g of a sensitizer (Kayacure DETX, manufactured by Nippon Kayaku Co., Ltd.), whereby a liquid coating composition was prepared.

Discotic liquid crystal compound

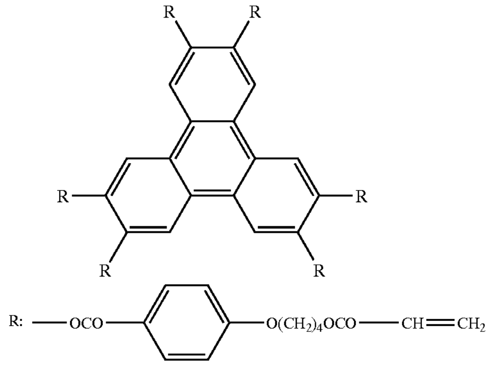

Subsequently, the aforesaid liquid coating composition was applied onto the alkyl-modified polyvinyl alcohol orientation layer employing a #3.6 wire bar and dried for two minutes in a 130° C. constant temperature zone, whereby the discotic compound was oriented. Subsequently, the resulting discotic compound was polymerized at an ambience of 60° C. by exposure to UV radiation for one minute, employing a 120 W/cm high pressure mercury lamp and allowed to equilibrate to room temperature.

Employing the Optical Compensation Polarizing Plates P, Q, R, and S coated with the optically anisotropic layer, were prepared were corresponding to Optical Compensation Cellulose Ester Films D, F, H, and I. Evaluation was carried out in the same manner as for Example 2. Optical Compensation Polarizing Plates P and R achieved improvement effects for viewing angle compensation durability, while Comparative Examples Q and S resulted in an evaluation of C regarding viewing angle durability. As a result, in this case, the effects of the present invention were also confirmed.

According to the present invention, it is possible to provide an optical compensation film exhibiting an excellent viewing angle compensation function and to provide an optical compensation film support capable of enhancing durability of the viewing angle compensation function during storage, an optical compensation film, a viewing angle compensation integral type polarizing plate, and a liquid crystal-display apparatus.

What is claimed is:

1. An optical compensation film comprising a cellulose ester film comprising cellulose ester wherein (a) each of photoelastic coefficient C(md) in a mechanical direction and a photoelastic coefficient C(td) in a transverse direction of the cellulose ester film is $1\times10^{-9}$ to $1\times10^{-13}$ $Pa^{-1}$, and C(md)<C(td);

(b) a retardation $R_0$ within a plane of the cellulose film defined by Formula (I) is 20 to 70 nm;

(c) a retardation $R_t$ of the cellulose ester film in a thickness direction defined by Formula (II) is 70 to 400 nm;

(d) each of a dimensional variation ratio S(md) in the mechanical direction and a dimensional variation ratio S(td) in the transverse direction of the cellulose ester film prior to and after being allowed to stand at ambient conditions of 80° C. and 90 percent relative humidity for 50 hours are −1 to 1 percent, and |S(md)|>|S(td)|; and (e) the cellulose ester simultaneously satisfies Formulas (IV) and (V);

$$R_0=(nx-ny)\times d \quad \text{(I)}$$

$$R_t=\{(nx+ny)/2-nz\}\times d \quad \text{(II)}$$

wherein nx is a refractive index in a transverse direction within a plane of the film, ny is a refractive index in a mechanical direction within a plane of the film, nz is a refractive index in a thickness direction of the film, and d is a thickness of the film in nm; and $$2.55\leq X+Y\leq 2.85 \quad \text{(IV)}$$

$$1.4\leq X\leq 2.85 \quad \text{(V)}$$

wherein X is a degree of substitution of an acetyl group and Y is a degree of substitution of a propionyl group or a butyryl group.

2. The optical compensation film of claim 1, which comprises an optically anisotropic layer.

3. The optical compensation film of claim 1, wherein the cellulose ester has a degree of acetylation of 59.0 to 61.5 percent, and comprises a compound having at least two aromatic rings in an amount of 0.1 to 20 parts by weight with respect to 100 parts by weight of the cellulose ester.

4. The optical compensation film of claim 2, wherein the optically anisotropic layer has a fixed nematic hybrid orientation structure.

5. The optical compensation film of claim 2, wherein the optically anisotropic layer contains a liquid crystal compound.

6. The optical compensation film of claim 5, wherein the liquid crystal compound is discotic liquid crystal.

7. A viewing angle compensation integral type polarizing plate comprising two protective films and a polarizer, wherein at least one of the protective films is the optical compensation film of claim 1, and a delayed phase axis of an ester film in the optical compensation film and a transparent axis of the polarizer are substantially parallel.

8. A liquid crystal display apparatus employing the viewing angle compensation integral type polarizing plate of claim 7.

9. A support for an optical compensation film comprising a cellulose ester film comprising cellulose ester wherein (a) each of a photoelastic coefficient C(md) in a mechanical direction and a photoelastic coefficient C(td) in a transverse direction of the cellulose ester film is $1\times10^{-9}$ to $1\times10^{-13}$ $Pa^{-1}$, and C(md)<C(td);

(b) a retardation $R_0$ within a plane of the cellulose film defined by Formula (I) is 20 to 70 nm;

(c) a retardation $R_t$ of the cellulose ester film in a thickness direction defined by Formula (II) is 70 to 400 nm;

(d) each of a dimensional variation ratio S(md) in the mechanical direction and a dimensional variation ratio S(td) in the transverse direction of the cellulose ester film prior to and after being allowed to stand at ambient conditions of 80° C. and 90 percent relative humidity for 50 hours are −1 to 1 percent, and |S(md)|>|S(td)|; and (e) the cellulose ester simultaneously satisfies Formulas (IV) and (V);

$$R_0=(nx-ny)\times d \quad \text{(I)}$$

$$R_t=\{(nx+ny)/2-nz\}\times d \quad \text{(II)}$$

wherein nx is a refractive index in a transverse direction within a plane of the film, ny is a refractive index in a mechanical direction within a plane of the film, nz is a refractive index in a thickness direction of the film, and d is a thickness of the film in nm; and $$2.55\leq X+Y\leq 2.85 \quad \text{(IV)}$$

$$1.4\leq X\leq 2.85 \quad \text{(V)}$$

wherein X is a degree of substitution of an acetyl group and Y is a degree of substitution of a propionyl group or a butyryl group.

* * * * *